United States Patent
Xu et al.

(10) Patent No.: US 10,716,255 B2
(45) Date of Patent: Jul. 21, 2020

(54) ADAPTIVE CONTROL SYSTEM FOR THRESHING SEPARATION LOAD OF TANGENTIAL FLOW AND LONGITUDINAL AXIAL FLOW DEVICE

(71) Applicant: JIANGSU UNIVERSITY, Jiangsu (CN)

(72) Inventors: Lizhang Xu, Jiangsu (CN); Chuncai Wei, Jiangsu (CN); Yaoming Li, Jiangsu (CN); Zhenwei Liang, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 211 days.

(21) Appl. No.: 15/743,493

(22) PCT Filed: Aug. 31, 2016

(86) PCT No.: PCT/CN2016/097599
§ 371 (c)(1),
(2) Date: Jan. 10, 2018

(87) PCT Pub. No.: WO2018/039997
PCT Pub. Date: Mar. 8, 2018

(65) Prior Publication Data
US 2020/0077582 A1 Mar. 12, 2020

(30) Foreign Application Priority Data
Aug. 29, 2016 (CN) .......................... 2016 1 0761347

(51) Int. Cl.
*A01D 41/127* (2006.01)
*A01F 12/58* (2006.01)
(Continued)

(52) U.S. Cl.
CPC .............. *A01D 41/127* (2013.01); *A01F 7/04* (2013.01); *A01F 7/06* (2013.01); *A01F 12/28* (2013.01); *A01F 12/446* (2013.01); *A01F 12/46* (2013.01)

(58) Field of Classification Search
CPC .. A01D 41/12; A01D 41/127; A01D 41/1243; A01F 7/04; A01F 7/06;
(Continued)

(56) References Cited

U.S. PATENT DOCUMENTS

| 5,795,223 | A | * | 8/1998 | Spiesberger | .......... | A01F 12/448 460/102 |
| 6,773,343 | B2 | * | 8/2004 | Grywacheski | ........ | A01F 12/444 460/100 |

(Continued)

FOREIGN PATENT DOCUMENTS

| CN | 101608979 A | 12/2009 |
| CN | 102273359 A | 12/2011 |

(Continued)

*Primary Examiner* — Robert E Pezzuto
(74) *Attorney, Agent, or Firm* — Saliwanchik, Lloyd & Eisenschenk

(57) ABSTRACT

The invention provides an adaptive control system and a regulating method for the threshing separation load of the combined harvester and the longitudinal axis. The control system mainly comprises entrainment loss monitoring device, grain breaking rate monitoring device, device for regulating clearance of cutting concave outlet, jitter board load monitoring device, return plate load monitoring device and on-line monitoring and control system. According to the differential signal of the impact force sensor and the inertial force sensor, the cutting flow threshing and separating device is calculated by real-time monitoring of the grain breaking rate, the entrainment loss rate, the tangential groove outlet gap, the cutting drum speed and the longitudinal axis drum speed. And the ratio of the threshing (Continued)

separation load of the cut-off threshing separator and the longitudinal-axial-flow threshing and separating device is adjusted at a reasonable ratio range, to meet the difficult to take off, easy to off and other crops of different harvest requirements, to maintain the best threshing capacity and better adaptability.

7 Claims, 17 Drawing Sheets

(51) Int. Cl.
*A01F 7/04* (2006.01)
*A01F 7/06* (2006.01)
*A01F 12/28* (2006.01)
*A01F 12/44* (2006.01)
*A01F 12/46* (2006.01)

(58) Field of Classification Search
CPC ........ A01F 12/44; A01F 12/385; A01F 12/46; A01F 12/446; A01F 12/444; A01F 12/18; A01F 12/30; A01F 12/48; A01F 12/448; A01F 12/28
USPC .... 460/1, 99, 101, 102, 73, 6, 111, 112, 117
See application file for complete search history.

(56) References Cited

U.S. PATENT DOCUMENTS

| | | | | |
|---|---|---|---|---|
| 8,052,374 B2* | 11/2011 | Ricketts | ................ | A01F 12/444 415/53.1 |
| 8,221,064 B2* | 7/2012 | Ricketts | ................ | A01F 12/444 415/184 |
| 8,608,534 B1* | 12/2013 | Stahl | .................... | A01F 12/444 460/99 |
| 8,616,945 B2* | 12/2013 | Ritter | ................ | A01D 41/1243 460/111 |
| 9,750,193 B2* | 9/2017 | Bonte | ................... | A01F 12/446 |
| 10,219,439 B1* | 3/2019 | Hillen | ..................... | A01F 12/44 |
| 2013/0157731 A1 | 6/2013 | Biggerstaff et al. | | |

FOREIGN PATENT DOCUMENTS

| | | |
|---|---|---|
| CN | 202232226 U | 5/2012 |
| CN | 202773468 U | 3/2013 |
| CN | 204272714 U | 4/2015 |
| CN | 104855058 A | 8/2015 |
| JP | 2003023848 A | 1/2003 |

* cited by examiner

ADAPTIVE CONTROL SYSTEM FOR THRESHING SEPARATION LOAD OF TANGENTIAL FLOW AND LONGITUDINAL AXIAL FLOW DEVICE

CROSS REFERENCE TO RELATED APPLICATIONS

This application is a National Stage Application of International Application Number PCT/CN2016/097599, filed Aug. 31, 2016; which claims priority to Chinese Application No. 201610761347.7, filed Aug. 29, 2016.

TECHNICAL FIELD

The invention belongs to the combine-harvester threshing and separation device and the adaptive control field. To be specific, an adaptive control system for the threshing separation load of the tangential flow and longitudinal axial flow devices.

BACKGROUND TECHNIQUE

At present, the combine-harvester has become large-scale, automation, and intelligent. From the development point of view, the harvest performance of the combine-harvester and automation of intelligent degree has become an important measure of modern agriculture. In recent years, with the development of China's agricultural machinery production and the impact of cross-regional harvest, the demand of combine harvester in countryside. It develops gradually from small to medium and large-scale. This is an urgent need for the corresponding on-line monitoring system to monitor the working conditions of key components. It allows the driver to control the work of the machine. It can also reduce the failure rate, improve operational performance and production efficiency, and extend the life of the machine. However, the level of intelligence and adaptive control of China's combine-harvester is still relatively low, and it needs real-time monitoring methods and adaptive control devices for working parameters and performance indexes.

For the combine-harvesters, the different crop varieties decide the difficulty of threshing separation. The maturity of early indica rice in the south is generally batter than others, which is easier to threshing separate. So most of the crops were threshed in the tangential flew reel and a few of them left into the latitudinal axial flow device. It results in that the work of the tangential flow device is large while the work of the longitudinal axial flow devices is small. It can also block the tangential flow device and crops can heap up on the jitter when the crops are wet and difficult to thresh the work of latitudinal axial flow device become large. If the work of the tangential flow device is large and the export of grave is not proper or the speed of the tangential flow device is high, it can lead to multiple threshing. This process increase the breaking rate of crop. Similarly, when the work of the longitudinal axial flow reel is large, the threshing of crop is not enough. It results in that the crops are blown out when they were not completely threshed. Therefore, how to adjust the separation of the longitudinal axial flow devices and the tangential flow device is an important problem in improving the production of the combine-harvester.

China utility model patent CN202232226 related to the selection of load regulation can eliminate the crop which just has cereal shell so that it can reduce the load of filtering grain. However, in the specific implementation process, it is easy to increase the grain entrainment loss rate. And the device is manually adjusted, so it cannot be adjusted in real time. The crop harvest adaptability is poor. CN104855058 A is a patent concentrating on the problems that materials pile up on both side of grading sieve and influence the screen. The invention solves the problem of uneven distribution of the surface material of the screen surface. It can adjust the opening of baffle plate of threshing device intelligently in real-time according to the loss of the grain but it does not solve the problem of material accumulation mainly the unreasonable proportion of the threshing separation load of the tangential and longitudinal axial flow. Only by regulating the flow and the longitudinal axis of the reel speed and other parameters can maintain the flow and longitudinal axial threshing separation load ratio a reasonable range. It can solve the problems at their source. The invention CN102273359 relates to an adaptive anti-clogging control system for a slitting flow combined harvester, which detects the rotational speed and torque of the tangential reel and the longitudinal flow reel by the detecting sensor during the threshing process, and carries out the pre-stored standard value comparison of judgments. According to the speed and torque changes to adjust the speed of tangent flow and longitudinal axial flow combine-harvester. The invention solves the problem of material blockage and overload in the process of threshing. But the invention just focuses on the clogging problem, There is no corresponding monitoring device real-time monitoring to monitor grain crushing rate, entrainment loss rate and other performance indicators. That is to say, there is a great possibility to get a high grain breaking rate and a high entrainment loss rate when we are adjust the tangential flow and longitudinal axial flow clearance. In addition, it doesn't refer to specific adjustment advice and execute solutions.

THE CONTENTS OF THE INVENTION

According to the present invention, there is proposed an adaptive control system for the threshing and separating load of the tangential flow and the longitudinal axial flow device, so that the cut-off threshing and separating device and the longitudinal axial flow threshing and separating device Of the threshing separation load ratio in a reasonable range, to meet the difficult to take off, easy to off and other crops of different harvest requirements, to maintain the best threshing capacity and better adaptability.

The present invention is achieved by the technical means described below.

The adaptive control system for the threshing separation load of the tangential and longitudinal axial flow device includes a cut-off reel, a cut-off concave plate, a longitudinal axial flow reel, a longitudinal axial graded plate sieve, a return plate, a screening screen. The plate is located below the tangential reel, which is mounted in a longitudinal axis flow reel, which is located below the longitudinal axis flow reel, which is located at the bottom of the cut reel (1) and the return plate and is located above the agar of the grain; characterized in that it further comprises a cut-off concave plate outlet gap adjusting device, a jitter plate load monitoring device, a return plate load monitoring device and an on-line monitoring and control system.

The first connecting rod, the second connecting pin, the second connecting rod, the third connecting pin, the rotating rod, the electric cylinder and the displacement sensor, one end of the first connecting rod is connected with the outlet end of the cutting groove through the first connecting pin and the other end is connected with one end of the second connecting rod through the second connecting pin and the other end of the second connecting rod is connected with the turning rod; the front end of the rotating rod the third connecting pin is hinged to the frame and is rotatable about the third connecting pin; the trailing end of the rotating rod is connected with the electric cylinder through the ball bearing; the displacement sensor is connected with the electric cylinder; the displacement sensor and the electric cylinder are Online monitoring and control system connected.

The jitter plate load monitoring device is mounted on the jitter plate of the cleaning screen and is located below the tangential reel, mainly including a jitter inertial force monitoring sensor, a first jitter monitoring board, a jitter impact monitoring sensor, a second jitter monitoring A jitter mounting plate and a jitter mount, the jitter mounting plate being fixed below the jitter plate by a jitter holder, and the jitter plate and the jitter mounting plate are provided with the same shape as the first jitter monitoring board and the second jitter monitor and the two through holes are corresponding in the vertical direction; the first jitter monitoring plate is located in the through hole in the jitter mounting plate and maintains a gap of 0.5 mm to 3 mm with the through hole edge; one end of the jitter impact sensor is fixed on the back of the jitter plate and the other end is fixed on the second jitter monitor the jitter inertial force sensor and the jitter impact sensor are connected with the on-line monitoring and control system.

The return plate load monitoring device is mounted on the return plate and is located under the longitudinal axial flow reel, which mainly comprises a return inertial force monitoring sensor, a first return monitoring board, a return impact force monitoring sensor, a second return monitoring board, a return installation board and back support; the backhaul mounting bracket plate beneath the surface of the return plate, the return mounting plate and back plate surface are opened and a first monitoring return plate, the second through holes same backhaul monitoring a plate shape, and two corresponding hole in the vertical direction; the first plate is monitored backhaul mounting plate through hole, and held with a gap 0.5 mm 3 mm-through hole edge; said second plate is monitored backhaul return through-hole board and maintain the gap 0.5 mm-3 mm edge of the through hole; return inertial force monitoring sensor installed in the return plate fixed to one end, the other end of the plate at a first fixed monitoring return; return impact force monitoring sensor one end of the return plate fixed to the back surface, the other end of the plate at a second fixed monitoring return; return inertial force monitoring sensor, monitoring the return impact sensors are online monitoring System connected to the system.

The on-line monitoring and control system is used to detect the inertial force and the impact force detected by the jitter inertial force sensor, the jitter impact sensor, the return inertial force monitoring sensor, the return impact force monitoring sensor, and the displacement detected by the displacement sensor. The load of the return plate is calculated as the load of the longitudinal axis flow reel according to the return inertia force and the return impact force, and the load of the reel is calculated according to the load of the tangential reel. Adjustable cross-flow gauges Adjust the gap of the cut-off gauges; and monitor the size of the exit gap of the gauges according to the displacement detected by the displacement sensor.

Further, the number of the wobble plate load monitoring devices is five, and the "X" type is arranged in the entire area of the jitter plate, and the specific position is determined according to the geometric size of the jitter plate; the amount of the dewatering material measured by the jitter plate load monitoring device The mathematical model of the mass of the exfoliation material in the entire area of the jitter plate is to be established by bench test. The number of the return board monitoring devices is five, and the "X" type is arranged in the entire area of the return plate. The specific position needs to be determined according to the geometrical dimensions of the return plate. The amount of the effluent measured by the return plate load monitoring device. The mathematical model of the quality of the effluent from the entire area of the return plate must be established by bench test.

Further comprising an entrainment loss monitoring device and a longitudinal axis flow reel governor, said entrainment loss monitoring device being mounted at the longitudinal axis of the longitudinal abutment and connected to the on-line monitoring and control system. The longitudinal axial reel speed regulating device is arranged at the rear end of the longitudinal axial reel shaft, and is composed of a first hydraulic cylinder, a first pulley movable part, a first belt and a first pulley fixing part. The first hydraulic cylinder and the first pulley movable portion are on the same side, and the first belt is located between the first pulley movable portion and the first pulley fixing portion. The first pulley fixing portion is fixed relative to the longitudinal axis reel shaft. The first pulley movable portion is axially movable along the longitudinal axis of the reel shaft by the action of the first hydraulic cylinder. It can change the size of the belt groove and then change the transmission ratio and control the longitudinal axis of the reel speed.

Further, it also includes grain break rate monitoring device and cutting reel speed control device. The grain breaking rate monitoring device is installed at the exit of the grain and it is connected with the online monitoring and control system. The cutting reel speed regulating device is composed of a second hydraulic cylinder, a second pulley movable part, a second belt and a second pulley fixing part. The second hydraulic cylinder and the second pulley movable portion are on the same side. The second belt is located between the second pulley movable portion and the second pulley fixing portion. The second pulley fixing portion is fixed with respect to the tangential reel shaft. The second pulley movable portion is axially movable along the tangential reel shaft by the action of the second hydraulic cylinder. Thereby it can change the size of the belt groove and then change the transmission ratio and control the cutting reel speed.

Further, the entrainment loss monitoring device consists of two mounting brackets and two monitoring sensors. Two mounting brackets are located in front of the longitudinal axis of the longitudinal groove. They are fixed on the longitudinal axis of the concave plate. Two monitoring sensors are mounted on the board facing the longitudinal axis flow reel. Two monitoring sensors are connected to the on-line monitoring and control system.

Further, the grain breaking rate monitoring device is composed of an image processor, a CCD camera, a grain information collecting plate and a light source. The image processor is mounted on the platform above the grain sponge exit. The upper part of the grain information collecting plate is fixed on the grain outlet of the grain. The CCD camera is mounted on the grain information acquisition board. It is connected to the image processor. Image processor, grain information acquisition board are connected with the online monitoring and control system.

The adaptive control method of tangential flow threshing and separating device load and axial flow, which is characterized in that the method comprises the following steps:

(S1) according to the characteristics of crop structure, threshing and separating device and related mechanical harvesting of national standards, set a reasonable shearing flow reel in the online monitoring control system (1) and axial flow reel (3) load ratio [$R_b$ $R_u$], tangential flow concave export clearance range [$C_b$ $C_u$], the shearing flow reel speed range [$n_{qb}$ $n_{qu}$], axial flow reel speed range [$n_{zb}$ $n_{zu}$], grain crushing rate threshold and entrainment loss rate threshold;

(S2) through which are installed on the grain auger (7) rate at the outlet of the grain crushing monitoring device (9) for real-time detection of grain crushing rate, with concave flow on the vertical axis (4) entrainment loss monitoring device at the mouth of the grass row (8) real-time detection of entrainment loss rate;

A clearance (1005) of the cut concave plate outlet is obtained by using a displacement sensor (1008) in parallel with an electric cylinder used for adjusting the clearance of the outlet of the cut concave plate;

According to the tangential flow speed sensor (105) and axial flow speed sensor (305) respectively tangential flow speed $n_{zb}$ and axial flow speed of reel $n_z$, Through the arranged on the sieve plate (6) jitter (601) load monitoring device on board (602) real-time detection of shaking board (601) on the load, as the shearing flow reel (1) load;

The return plate load monitoring device (502) mounted on the return plate (5) detects the load on the return plate (5) in real time as a load of the longitudinal axis flow reel (3);

The on-line monitoring control system calculates the load ratio of the cutting reel (1) and the longitudinal flow reel (3) according to the load of the cutting reel (1) and the load of the longitudinal axial flow reel (3);

(S3) on-line monitoring and control system based on the real-time detection of the grain crushing rate B, entrainment loss rate L, tangential flow concave outlet gap C, tangential flow of axial flow speed of reel $n_q$, reel speed $n_z$, shearing flow reel (1) and axial flow reel (3) of the load ratio R according to the following strategy to control the tangential flow concave export clearance. Tangential flow speed of reel, axial flow reel speed; return (S2);

When the entrainment loss rate of grain L≤$L_j$, crushing rate B>$B_r$;

If the shearing flow reel (1) and axial flow reel (3) of the load ratio R≥$R_u$, then determine the shearing flow reel speed $n_q$ whether or not ≤$n_{qb}$. If not, Decrease of tangential flow speed of reel $n_q$. If it is, and the tangential flow concave export clearance C≥$C_u$, and System alarm, if it is, But the clearance between the cutting and concave plates exits C>$R_u$, and The clearance between the cutting and the concave plates is increased C;

If the cutting reel (1) is compared with the load ratio of the longitudinal flow reel (3) $R_b$<R<$R_u$, then judge the speed of the cutting reel $n_q$ whether or not ≤$n_{qb}$, if not, decrease of tangential flow speed of reel $n_q$; if so, and the axial flow reel speed $n_z$≤$n_{zb}$, and System alarm, if so, but the axial flow reel speed $n_z$>$n_{zb}$, decrease of axial flow reel speed; $n_z$;

If the shearing flow reel (1) and axial flow reel (3) is less than the load ratio R≤$R_b$, axial flow speed is less than or equal to the reel to determine if it is, then, the system alarm, if not, decrease of axial flow reel speed $n_z$;

When the entrainment loss rate L≤$L_j$, grain crushing rate B>$B_r$:

If the shearing flow reel (1) and axial flow reel (3) of the load ratio is no less than $R_u$, determine the tangential flow outlet gap C is in concave tangential flow outlet gap range [$C_b$ $R_u$], if C≥$C_u$, increases the tangential flow concave export clearance, if more than $C_u$, then determine the shearing flow reel speed $n_q$ is less than or equal $n_{qb}$. If not, then reduce the tangential flow speed of reel $n_q$, if it is, then the alarm system;

If the load ratio of the cutting reel (1) and the longitudinal flow reel (3) is $R_b$<R<$R_u$, the parameters are normal and need not be adjusted;

If the shearing flow reel (1) and axial flow reel (3) is less than or equal to the load ratio, determine the tangential flow outlet gap is in concave tangential flow outlet gap range [$C_b$ $C_u$], if less than or equal to $C_b$, then determine the shearing flow reel speed $n_q$ is greater than or equal to $n_{qu}$, if it is, then the system alarm; if not, increases. Tangential flow speed of reel $n_q$, if C>$C_b$, decrease of tangential flow concave sieve export clearance C;

When the entrainment loss rate of grain L>$L_j$ crushing rate B>$B_r$:

If the speed is less than or equal to the shearing flow reel, determine the longitudinal axial flow reel speed $n_z$ is less than or equal to $n_{zb}$, if it is, the system alarm, if not, then reduce the axial flow reel speed $n_z$;

If the cutting reel speed is greater $n_{qb}$, then the cutting reel speed is reduced $n_{zb}$;

When the entrainment loss rate L>$L_j$, grain crushing rate less than $B_r$:

If the shearing flow reel (1) and axial flow reel (3) of the load ratio is no less than $R_u$ the system alarm;

If the shearing flow reel (1) and axial flow reel (3) of the load ratio $R_b$<R<$R_u$, determine the longitudinal axial flow reel speed $n_z$ is less than or equal to $n_{zb}$, if it is, the system alarm, if not, then reduce the axial flow reel speed $n_z$;

If the shearing flow reel (1) and axial flow reel (3) is less than or equal to $R_b$ the load ratio, determine the tangential flow concave gap C is less than or equal to $C_b$ export, if not, then reduce the tangential flow concave export clearance C, if further determining axial flow reel speed $n_z$ whether less than $n_{zb}$, if it is, the system alarm, if not. Decrease of axial flow reel speed $n_z$.

Further, the load of the tangential reel in step (2) is based on the jitter inertial force sensor. The load of the tangential reel in step (2) is calculated from the differential signal of the inertia force and the impact force detected by the jitter inertial force sensor, the dithering force sensor. The load of the longitudinal axis reel is calculated based on the differential force signal of the inertial force monitoring sensor, the return impact force monitoring sensor and the inertial force and the impact force.

The benefits of this invention:

The present invention is aimed at the problem of the threshing and separating part of the joint harvester in China: The imbalance of the separation ratio of the cut-off and the longitudinal axial flow can not meet the requirements of the different varieties of crops. And it cannot maintain the best threshing ability and better adaptability. The invention proposes an adaptive control system for the separation and unloading load of the combined harvester and the longitudinal axis. The system is based on the requirements of the grain crushing rate, the entrainment loss rate to meet the requirements on the basis of adaptive according to the jitter plate off the material quality and the return plate off the material quality control cut off the concave plate export gap, cutting reel speed and longitudinal axis reel speed. So that the ratio of the threshing separation load of the cut-off threshing separator and the longitudinal axis threshing separator is within a reasonable range.

(2) The invention can also monitor the grain breaking rate and the entrainment loss rate in the threshing process in real time. Not only can reflect the effect of grain cleaning in real time, but also through the adaptive control system to adjust the cutting reel speed, longitudinal axis reel speed to ensure the grain break rate, entrainment loss rate qualified.

(3) The adaptive control system of the threshing separation load is not limited to the tangential and longitudinal axial flow devices. It is also suitable for other types of threshing and separation devices. Such as: cut flow+double vertical axis threshing and separation device, cut flow+ horizontal axis flow, transverse axis flow+horizontal axis flow and other multi-reel threshing and separation devices are also applicable. We can regulate the grain breakage rate, entrainment loss rate, initial unloading load and freewheeling load, and use the above-mentioned adaptive control system of threshing separation load to adjust the exit angle of the concave plate, the speed of the primary reel and the speed of the re-reel. So that the ratio of the first and the offload is within a reasonable range. To meet the harvest requirements of different varieties of crops to maintain the best threshing capacity and better adaptability. And it is also adapted to such as wheat, soybean, rice, rape, corn and other crops threshing separation load control. It will greatly promote China's harvest machinery adaptive control field of technological progress.

DETAILED DESCRIPTION

The invention will now be described in further detail with reference to the accompanying drawings and specific examples, but the scope of protection of the present invention is not limited to this article.

Figure 1:
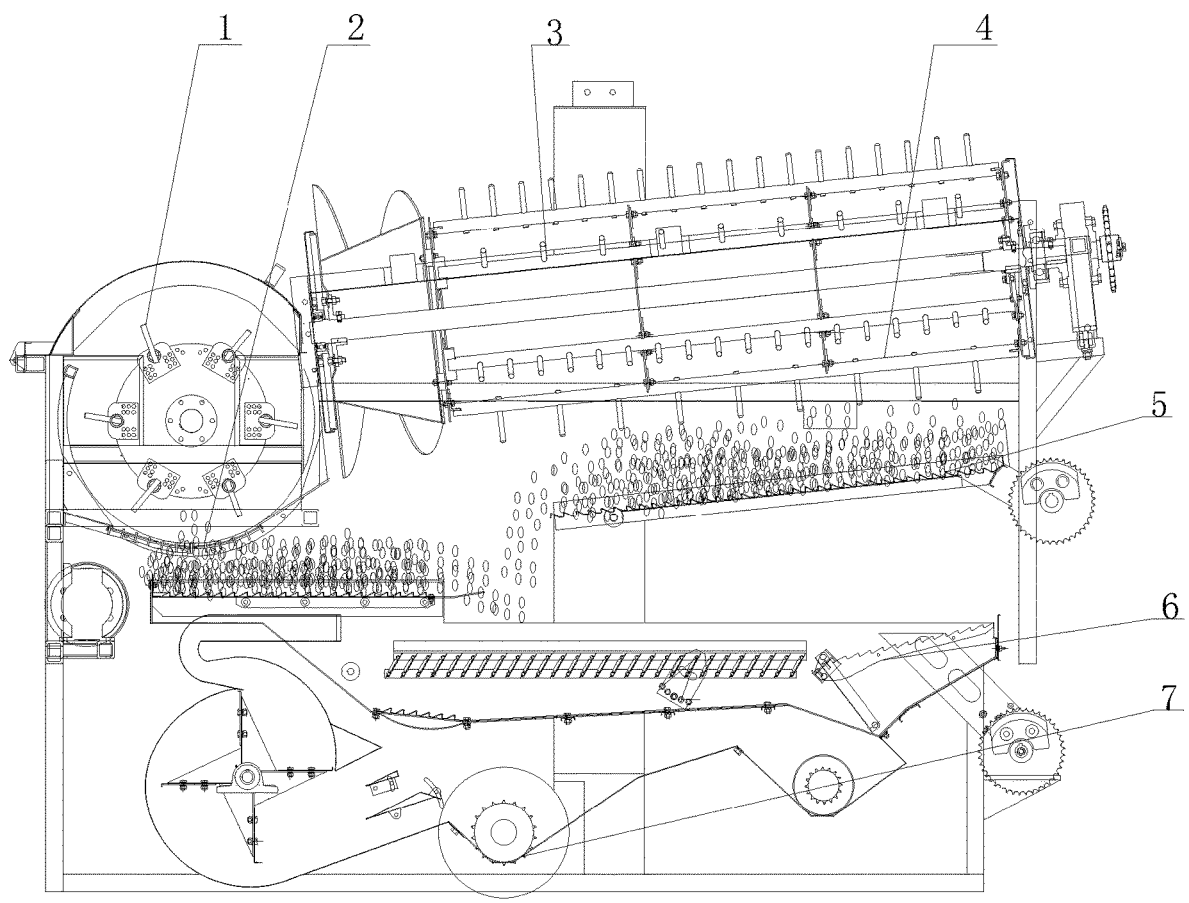
FIG. 1 is a front view of an adaptive control system for the threshing and separating load of the cutting and longitudinal axial flow device according to the invention.

The structure of the adaptive control system for the threshing and separating load in the cut-off and longitudinal axial flow devices is shown in FIG. 1. The tangential and longitudinal axial threshing separator consists of a cut-off cylinder 1, a cut-off concave plate 2, a longitudinal axial flow reel 3, a longitudinal axial grading plate 4, a return plate 5, a screening screen 6, A loss monitoring device 8, a grain break rate monitoring device 9, and a cut-off recessed outlet clearance adjusting device 10. The jitter plate 601 is located below the tangential reel 1. The longitudinal axial groove 4 is mounted in the longitudinal axis reel 3. The return plate 5 is located below the longitudinal axis cylinder 3. The cleaning screen 6 is located below the tangential reel 1 and the return plate 5 and is located above the grain. After the grain being threshed by the cut-off reel 1, the grain passes through the cut-off recess 2 into the dither board 601. Another part of the grain is not threshed or not off the net through the cut off the concave plate 2 exports. The material is fed into the longitudinal axis cylinder 2 located behind the tangential reel 1 After the grain is retracted, the seeds are screened onto the return plate 5 through the longitudinal axis of the longitudinal axis under the longitudinal axis cylinder 2. The grain on the wobble plate 601 is pushed backwards. The grain on the return plate is pushed forward. They all fall on the selection screen 6 below. After the removal of the vibrating screen, the seeds fall into the bottom of the grain. They are transported to the grain bin by horizontal and vertical helix.

Figure 2:
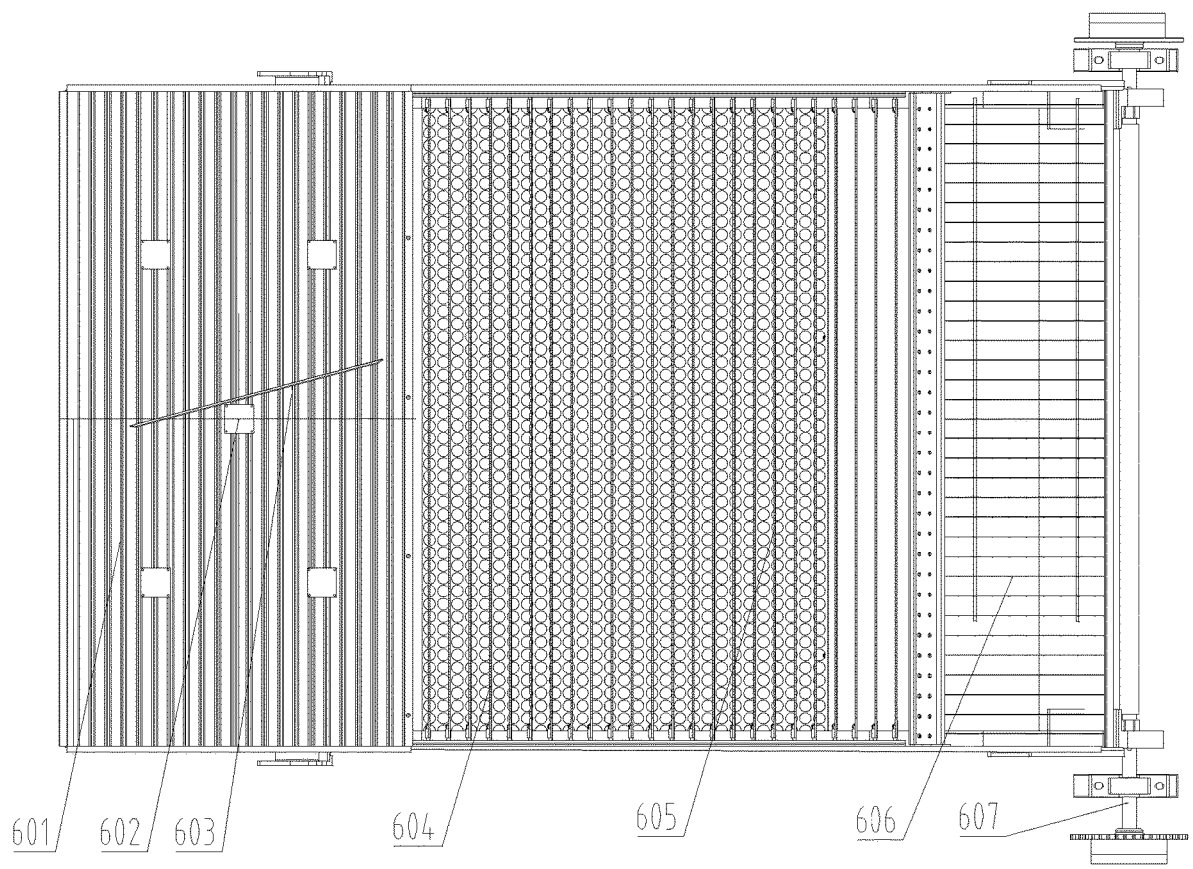
FIG. 2 is a top view of the combined harvester screening screen and the jitter plate load monitoring device.
Figure 3:
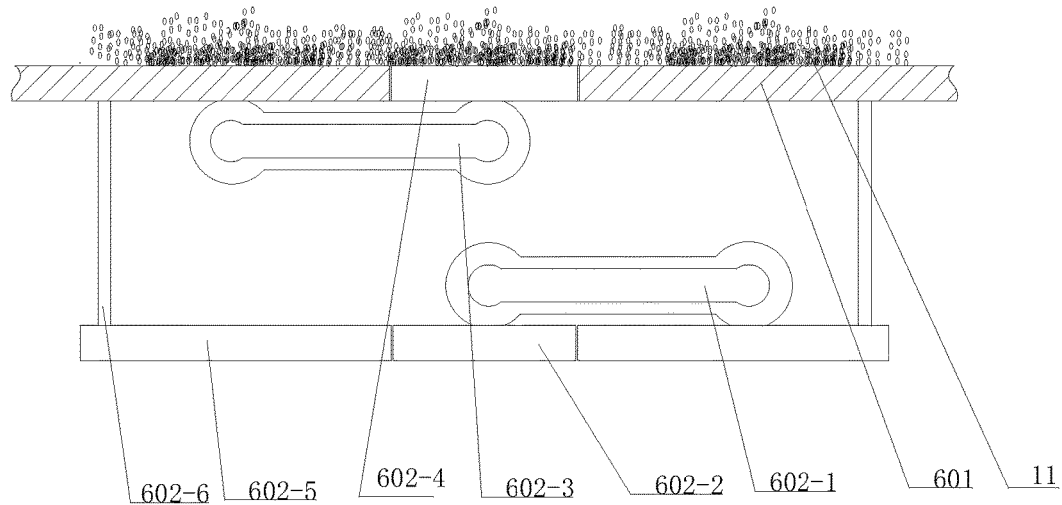
FIG. 3 is a partially enlarged front view of the jitter plate load monitoring device.

The adaptive control system of the present invention further includes a cut-off recessed outlet clearance adjusting device 10, a jitter plate load monitoring device 602, a backhaul board load monitoring device 502, and an on-line monitoring and control system. As shown in FIGS. 2 and 3, the cleaning screen 6 includes a jitter plate 601, a jitter plate load monitoring device 602, a deflector 603, a fish scale screen 604, a vibrating screen 605, a tail sieve 606, and a vibrating screen drive mechanism 607. The wiper plate 601 is located on the upper side of the upper vibrating screen 604, and the baffle 606 is located on the rear side of the upper vibrating screen 605 for discharging the long straw. The jitter plate load monitoring device 602 is located in the area of the jitter plate 601 below the tangential reel 1, which includes a jitter inertial force monitoring sensor 602-1, a first jitter monitoring plate 602-2, a jitter impact monitoring sensor 602-3, a second jitter monitoring plate 602-4, a jitter mounting plate 602-5, and a jitter holder 602-6. The jitter mounting plate 602-5 is fixed to the lower side of the jitter plate 601 through the jitter holder 602-6. The jitter plate 601 and the jitter mounting plate 602-5 are provided with a through hole with the same shape as the first jitter monitor plate 602-2 and the second jitter monitoring plate 602-4. And the two through holes correspond in the vertical direction. The first jitter monitoring plate 602-2 is located in the through hole in the jitter mounting plate 602-5. And it maintains a gap of 0.5 mm to 3 mm with the edge of the through hole. The second jitter monitoring plate 602-4 is located in the through hole of the jitter plate 601. It maintains a gap of 0.5 mm to 3 mm with the edge of the through hole. The first jitter monitoring plate 602-2 is located just below the second jitter monitoring plate 602-4. Their material, size and other properties are the same. One end of the jitter inertial force sensor 602-1 is fixed to the jitter mounting plate 602-5. And the other end thereof is fixed to the first jitter monitoring plate 602-2. One end of the dither impact sensor 602-3 is fixed to the back surface of the dither plate 601 and the other end is fixed to the second jitter monitor board 602-4. The jitter inertial force sensor 602-1, the jitter impact sensor 602-3 are connected to the on-line monitoring and control system. The signal of the dithering force sensor 602-4 and the dithering inertial force sensor 602-3 is subjected to signal processing such as a difference algorithm to calculate the influence of the inertia force of the jitter plate 601. We can obtain the mass of the exfoliation 11 in the area of the second jitter monitor 602-4 in the wobble plate 601. In order to more fully reflect the load of the entire area of the jitter plate 601, a number of jitter plate load monitoring devices 602 are arranged in the area of the jitter plate 601. The quality of the entire area exfoliation 11 of the dash plate 601 is obtained by the 11 mass of the plurality of zone exudates and the established mathematical model. It can be used to characterize the threshing separation load of the cut-off threshing separator. The greater the mass of the exfoliation 11 in the entire area of the jitter plate 601, the greater the threshing separation load of the cut-off threshing separator, vise versa.

Figure 4:
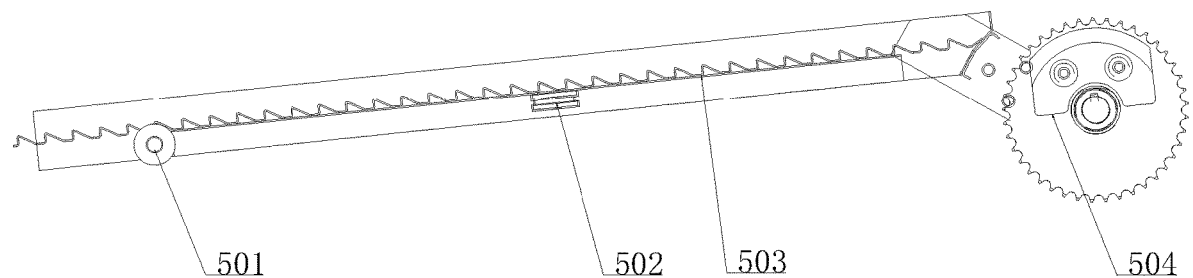
FIG. 4 is a front view of the return plate and the return plate load monitoring device.
Figure 5:
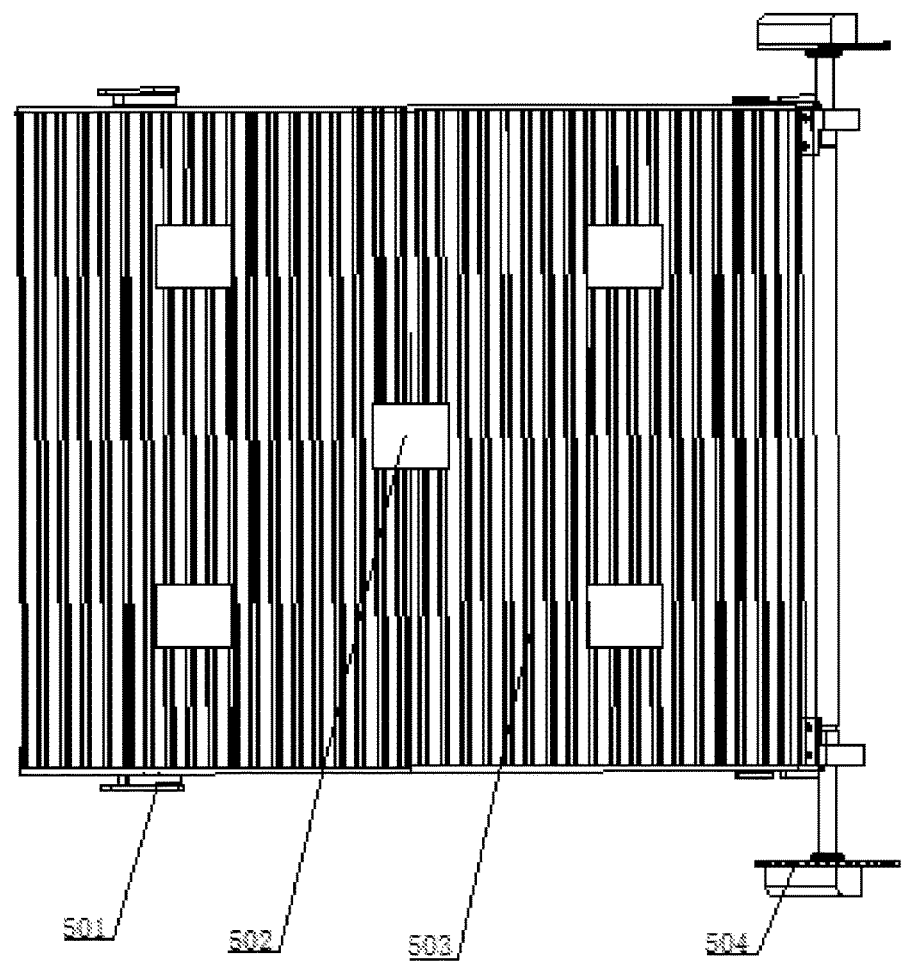
FIG. 5 is a top view of the return plate and the return plate load monitoring device.
Figure 6:
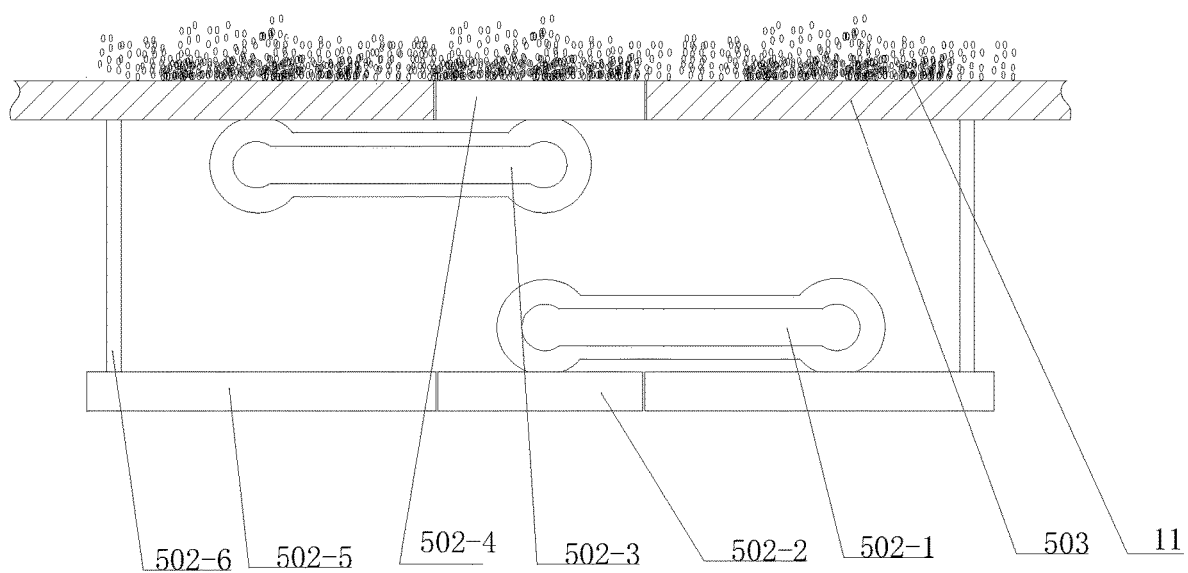
FIG. 6 is a partial view of the return plate load monitoring device.

As shown in FIGS. 4, 5 and 6, the return plate 5 includes a front axle 501, a return plate load monitoring device 502, a return plate surface 503, and a return plate drive mechanism (504). The return mounting plate 502-5 is fixed below the return plate surface 503 through the return bracket 502-6. The return path plate 503 and the return plate 502-5 are provided with through holes having the same shape as the first return monitoring board 502-2 and the second return monitoring board 502-40. And the two through holes correspond in the vertical direction. The first return monitoring plate 502-2 is located in the through hole in the return mounting plate 502-5. And it maintains a gap of 0.5 mm to 3 mm with the edge of the through hole. The second return monitoring plate 502-4 is located in the through hole of the return plate surface 503 and maintains a gap of 0.5 mm to 3 mm with the through hole edge. The first return monitoring board 502-2 is located just below the second return monitoring board 502-4. Their material, size and other properties are the same. One end of the return inertial force monitoring sensor 502-1 is fixed to the return mounting plate 502-5 and the other end is fixed to the first return monitoring board 502-2. One end of the return impact detection sensor 502-3 is fixed to the back surface of the return plate surface 503 and the other end is fixed to the second return monitoring board 502-4. The return inertial force monitoring sensor 502-1 and the return impact force monitoring sensor 502-3 are connected to the on-line monitoring and control system. The signal of the return impact sensor 502-4 and the return inertial force sensor 502-3 is subjected to signal processing such as a difference algorithm to calculate the influence of the inertial force of the return plate 5. Then we can obtain the mass of the exfoliation 11 in the area of the second return monitoring board 502-4 in the return plate 5. In order to more fully reflect the load of the entire area of the return surface 503, a number of return plate load monitoring devices 502 are arranged in the area of the return plane 503. We can obtain the quality of the entire area exfoliation 11 of the return plate surface 503 by the quality of the plurality of zone exits 11 and the established mathematical model. It is used to characterize the threshing separation load of the longitudinal axis threshing separator. That is it say, the greater the mass of the exfoliation 11 of the return plate surface 503, the greater the threshing separation load of the longitudinal axis threshing separator, vise versa.

The wobble plate load monitoring device 602 and the return plate load monitoring device 502 have the same structure and principle of action. As an embodiment, the number of jitter plate load monitoring devices 602 is five. They are arranged in the "X" type throughout the area of the jitter plate 601. The exact location of which is determined by the geometry of the jitter plate 601. The mathematical model of the mass of the exfoliation measured by the wobble plate load monitoring device 602 and the mass of the exfoliation of the entire area of the jitter plate 601 is to be established by a bench test. The number of return board load monitoring devices 502 is five. They are arranged in the "X" type in the entire area of the return plane 503. It's exact location to be determined according to the geometric size of the return plane board 503. The mathematical model of the mass of the exfoliation material measured by the return plate load monitoring device 502 and the mass of the entire area of the return plate surface 503 is to be established by a bench test.

Figure 7:
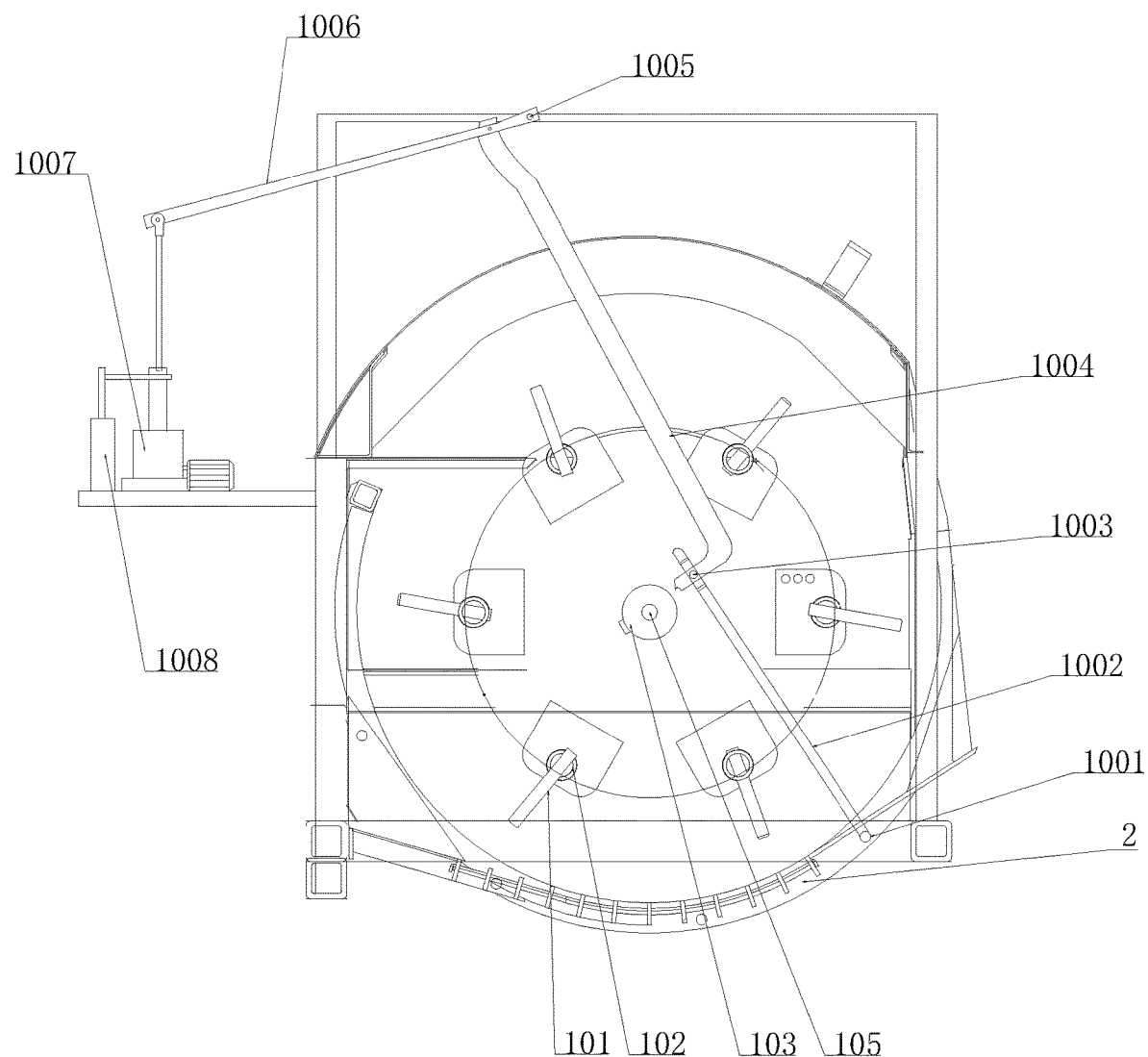
FIG. 7 is a front view of the cut-off recessed outlet clearance adjusting device.

As shown in FIG. 7, the cut-off reel 1 includes a cut-out pin 101, a cut-out tooth barrel 102, a cut-off reel shaft 103, a cut-off reel governor 104, and a cut-off speed sensor 105. As shown in Fig. The cogging plate exit gap adjusting device 10 includes a first connecting pin 1001, a first connecting rod 1002, a second connecting pin 1003, a second connecting rod 1004, a third connecting pin 1005, a rotating lever 1006 electric cylinder 1007, and a displacement sensor 1008 composition. One end of the first connecting rod 1002 is connected to the outlet end of the cutout recess 2 through the first connecting pin 1001 and the other end is connected to one end of the second connecting rod 1004 through the second connecting pin 1003. The other end of the second connecting rod 1004 is connected to the turning rod 1006 by a hinge. The front end of the rotating lever 1006 is hinged to the frame through the third connecting pin 1005. It is rotatable about the third connecting pin 1005. The trailing end of the turning lever 1006 is connected to the electric cylinder 1007 through a ball bearing. The cut-off recess 2 is driven by the telescopic drive of the electric cylinder 1007 to realize its exit gap adjustment. And a displacement sensor 1008 which is connected in parallel with the electric cylinder 1005. The displacement sensor 1008 and the electric cylinder 1005 of the present invention are connected to the on-line monitoring and control system to obtain a real-time exit gap change value.

In order to enable the threshing to meet the requirements of entrainment loss and grain breakage, the adaptive control system for the threshing separation load of the present invention also includes a entrainment loss monitoring device 8, a grain breaking rate monitoring device 9, a cutting reel speed regulating device 104, Axial reel speed control device.

Figure 8:
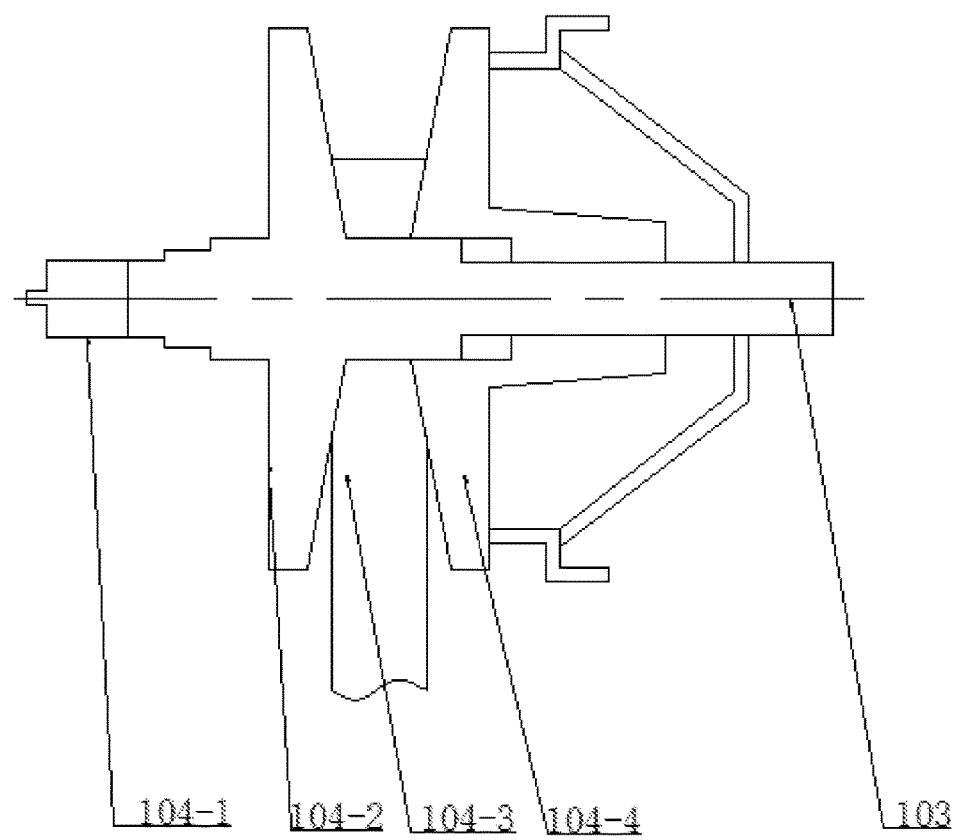
FIG. 8 is a top view of the tangential reel governor.

As shown in FIG. 8, the cut-off reel governor 104 is composed of a second hydraulic cylinder 104-1, a second pulley movable portion 104-2, a second belt 104-3, and a second pulley fixing portion 104-4. The second hydraulic cylinder 104-3 and the second pulley movable portion 104-1 are on the same side. The second belt 104-3 is located between the second pulley movable portion 104-2 and the second pulley fixing portion 104-4. The second pulley fixing portion 1044-4 is fixed relative to the tangential reel shaft 103, and the second pulley movable portion 104-1 is movable in the axial direction of the tangential reel shaft 103 by the action of the second hydraulic cylinder 104-1 movement. It can change the size of the belt groove, and then change the transmission ratio, control the cutting reel speed.

Figure 9:
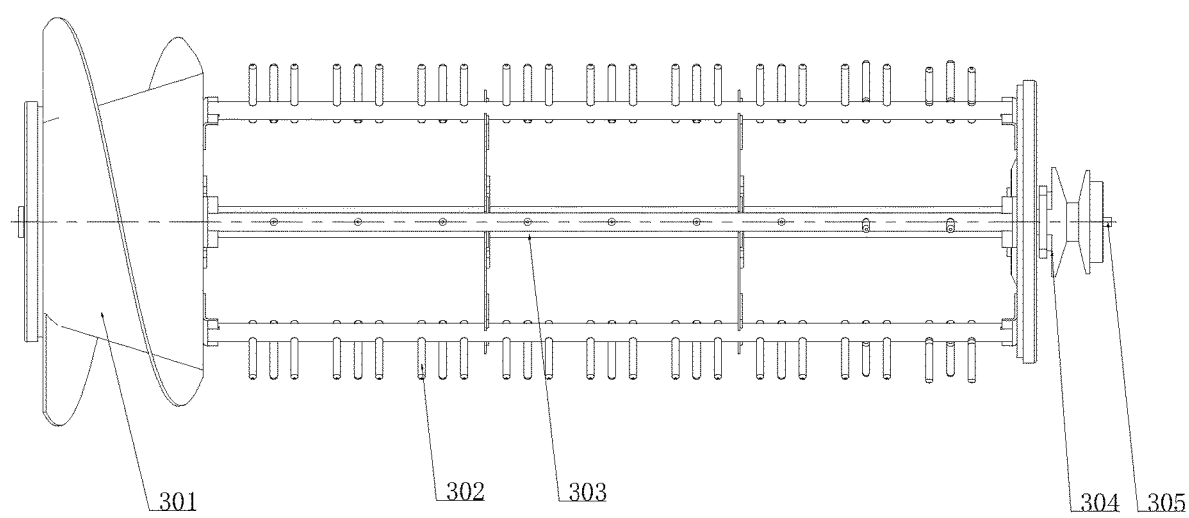
FIG. 9 is a top view of the longitudinal axis threshing device.
Figure 10:
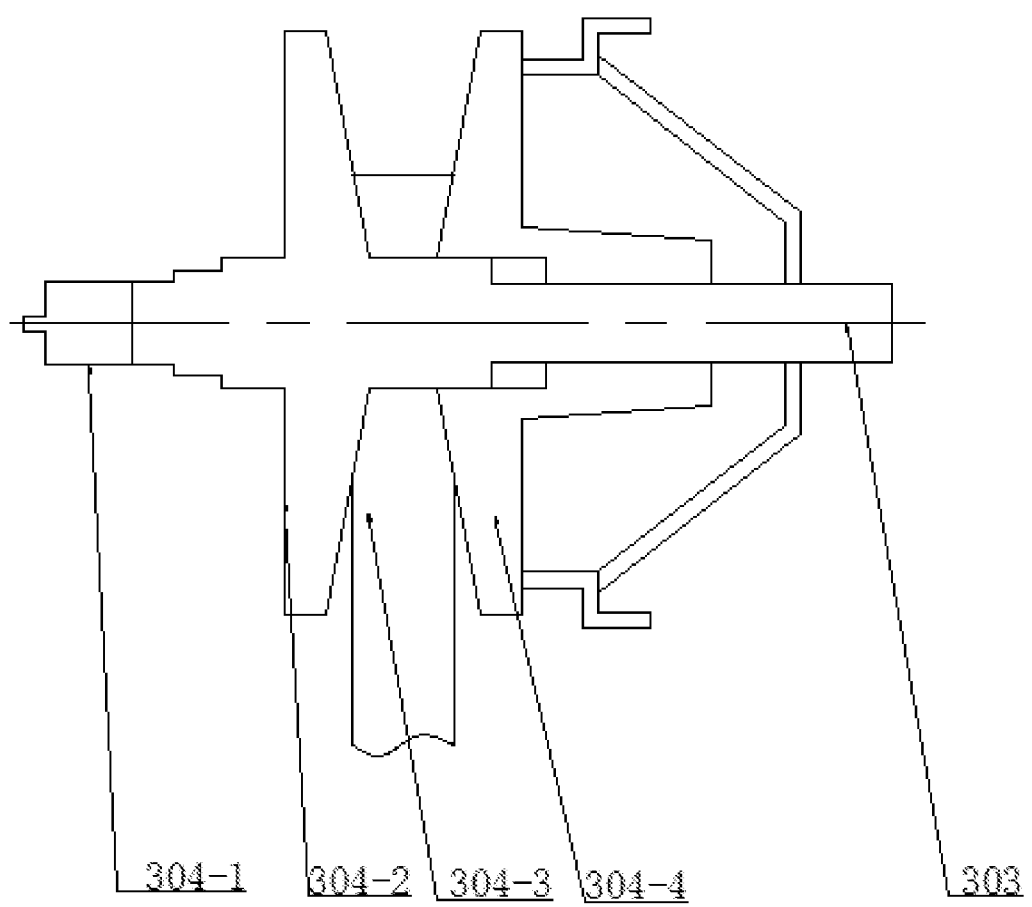
FIG. 10 is a top view of the longitudinal axis reel governor.

As shown in FIGS. 9 and 10, the longitudinal axial flow reel 3 includes a helical feed head 301, a longitudinal axial flow spine 302, a longitudinal axis reel shaft 303, a longitudinal axis flow reel governor 304, and a longitudinal axis rotational speed sensor 305. The vertical axial reel speed regulating device 304 is mounted on the rear end of the longitudinal axis reel shaft 303.3 and the first pulley fixing portion are composed of 304-4. The first hydraulic cylinder 304-1 and the first pulley movable portion 304-1 are on the same side. The first belt 304-3 is located between the first pulley movable portion 304-2 and the first pulley fixing portion 304-4. The first pulley fixing portion 104-5 is fixed with respect to the longitudinal axis reel shaft 303. The first pulley movable portion 304-1 can be moved axially along the longitudinal axis reel shaft 303 by the action of the first hydraulic cylinder 304-1. It can change the size of the belt groove. Then change the transmission ratio and control the longitudinal axis of the reel speed.

Figure 11:
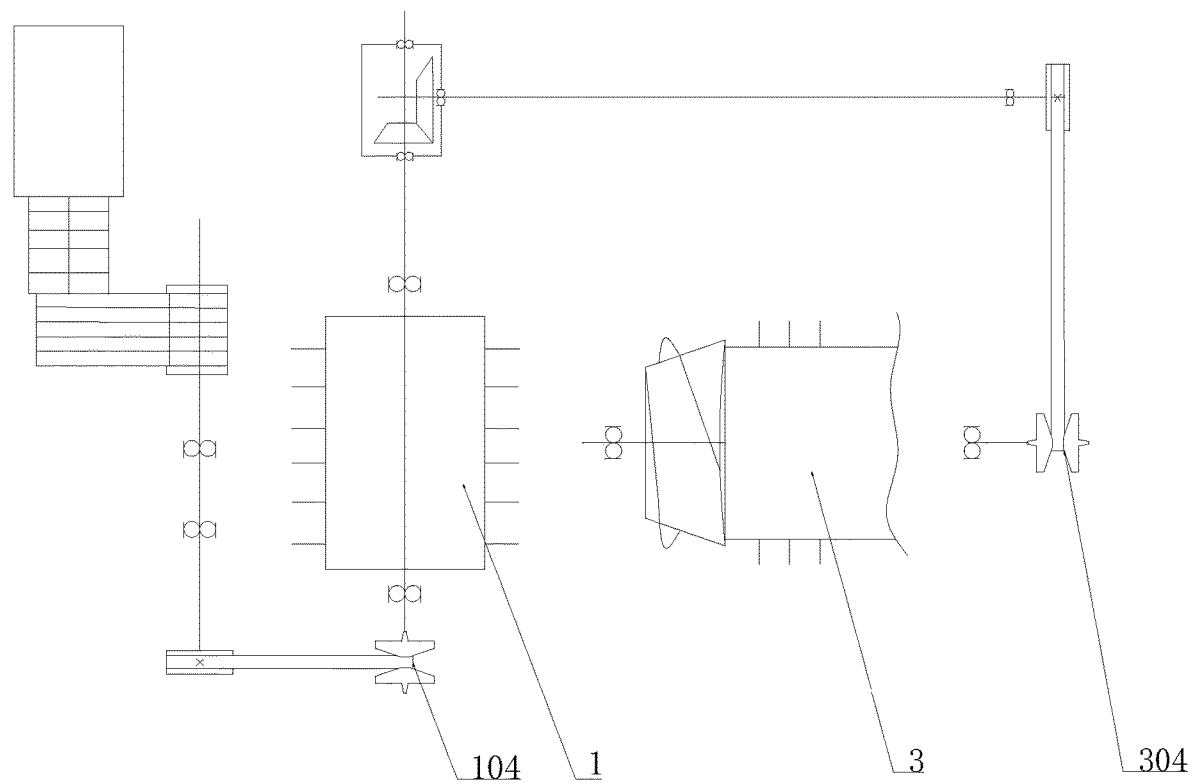
FIG. 11 is the flow and the longitudinal axis of the flow of power transmission and speed diagram.

As shown in FIG. 11, the power is transmitted from the engine five-slot reel to the intermediate shaft. And the other end of the intermediate shaft is connected to the tangential reel governor 104 through the second belt 104-3 to transmit power to the cutting reel shaft 103. And the other end of the tangential reel shaft 103 is transmitted to the longitudinal end of the longitudinal axis. The tail is connected to the longitudinal axis reel speed control device 304 through the belt first belt 304-3. The power is finally transmitted to the longitudinal axis reel shaft 303 to achieve the tangential reel and longitudinal axis flow can be variable speed target.

Figure 12:
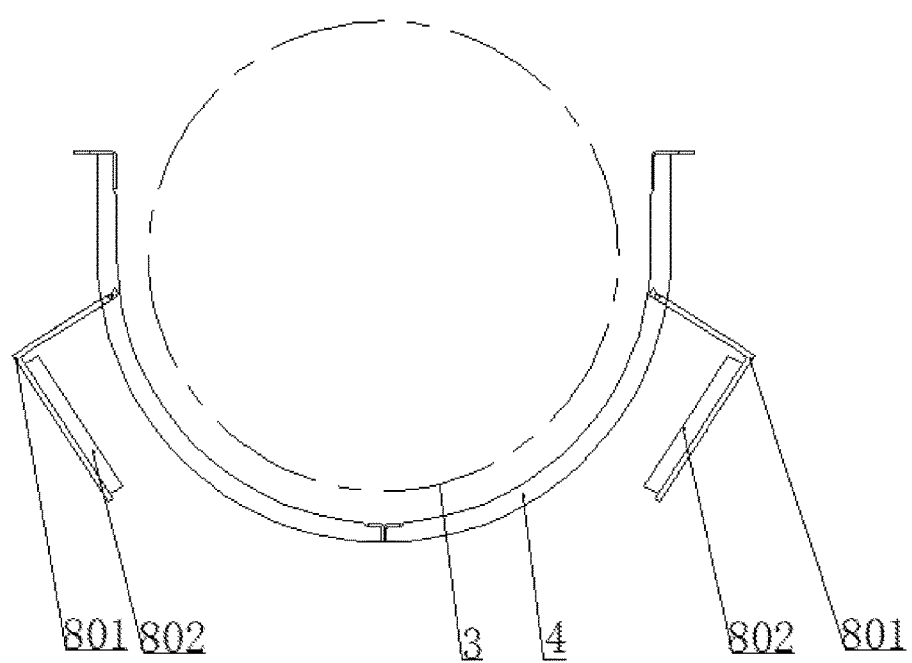
FIG. 12 is a view of the entrainment loss monitoring device.

As shown in FIG. 12, the entrainment loss monitoring device 8 is composed of two mounting brackets 801 and two monitoring sensors 802. The two mounting brackets 801 are located in front of the sloping mouths of the longitudinal axis. They are fixed to the longitudinal axial groove 4. The two monitoring sensors 802 are mounted on the board surface of the carriage 801 toward the longitudinal axis cylinder 3. We can refer to the mathematical model of the amount of grain and the amount of entrainment loss in the front of the mouth of the longitudinal axis of the vertical axis of the existing two monitoring sensors 802 to calculate the entrainment loss rate and real-time display.

Figure 13:
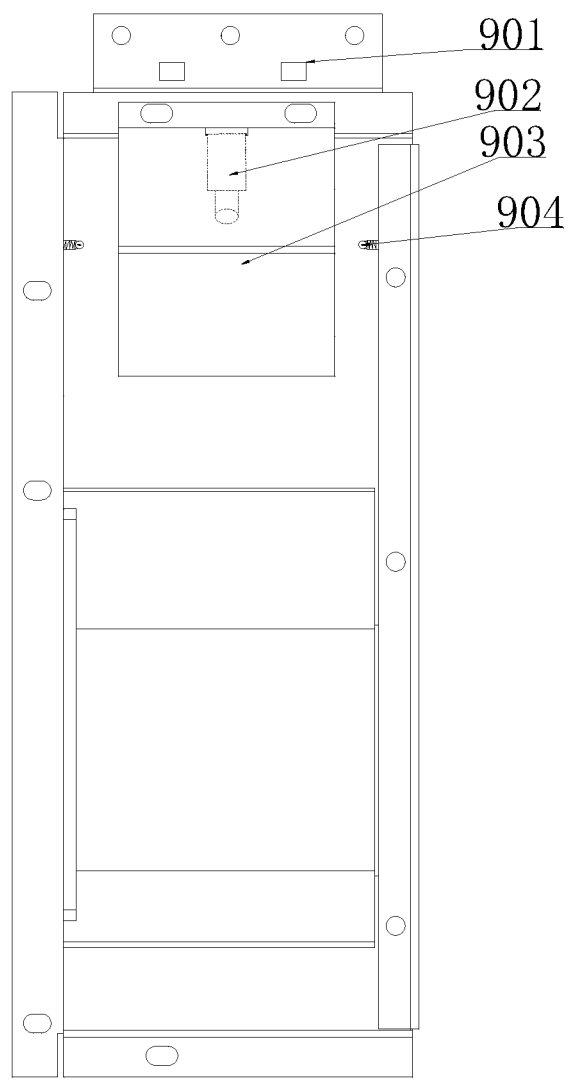
FIG. 13 is a view of the grain break rate detection device.

As shown in FIG. 13, the grain break rate monitoring device 9 is composed of an image processor 901, a CCD camera 902, a grain information collecting plate 903, and a light source 904. The image processor 901 is mounted on a platform above the grain spike exit. The upper part of the grain information collecting plate 903 is fixed on the grain sponge exit wall. The CCD camera 902 is mounted on the grain information collecting plate 903. When the machine is continuously operated, the seeds are continuously discharged from the auger. It will form a continuous grain flow on the grain information acquisition plate 903. We can obtain image information at the exit of the high quality grain agitation through the CCD camera 902 and the light source 904. The image acquired by the CCD camera 902 is transmitted to the image processor 901 through the data line. The image preprocessing unit of the image processor 901 converts the image to be measured into a grayscale image and performs a mean filter, median filtering. And it can also remove the noise and enhance the image. Finally, the gray scale image is converted into a binarized image. Then different morphological characteristics of crushed and complete kernel were extracted by morphological method. We calculate the area and the number of broken grains and the complete grain then we can get the grain breaking rate of real-time information according to the established model.

Figure 14:
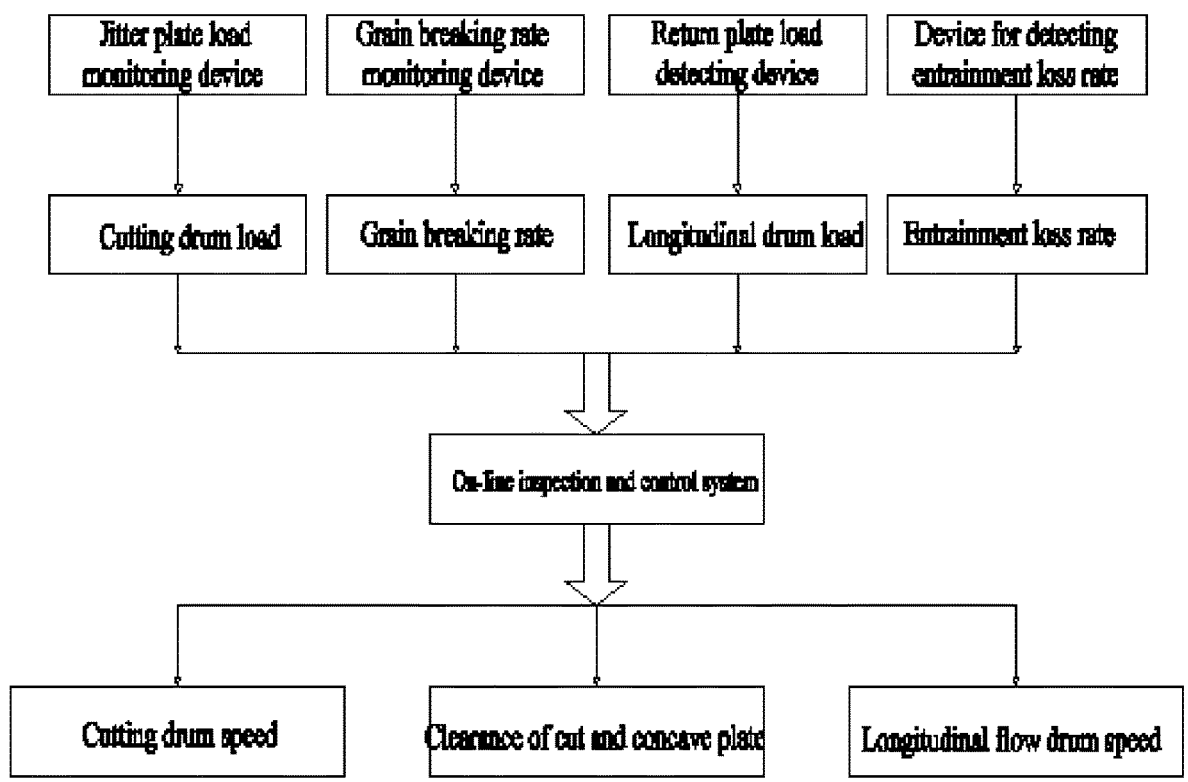
FIG. 14 is a diagram showing the relationship between the monitoring device and the control device.
Figure 15:
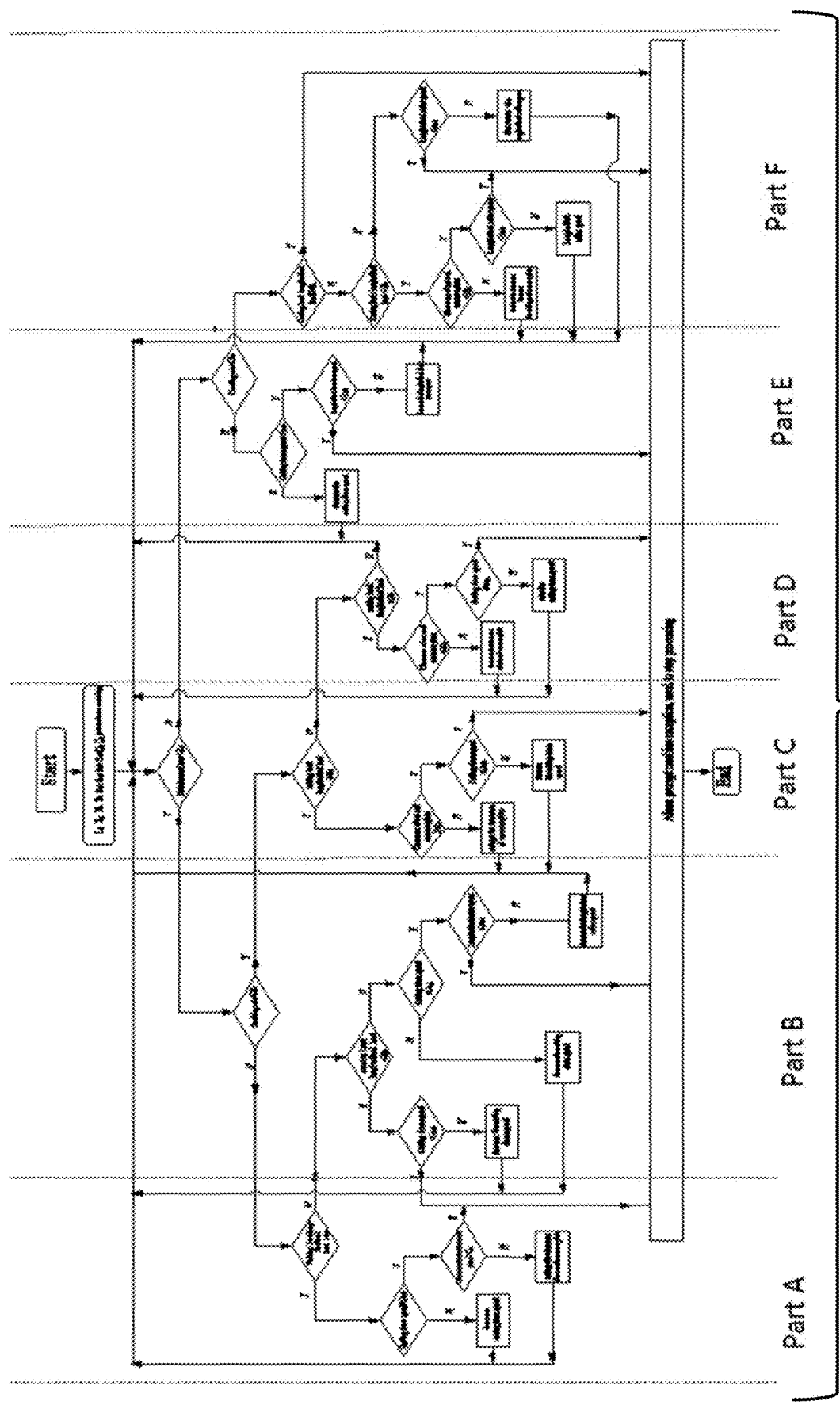
FIGS. 15-15F show the flow chart of the adaptive control system for the threshing and separating load of the tangential and longitudinal axial flow devices In the picture: 1—cut reel, 2—cut groove, 3—axial flow reel, 4—axial grain sieve, 5—backplane, 6—clear screen, 7—grain spinning, 8—monitoring device, 9—grain breaking rate monitoring device, 10—cutting ballast outlet clearance adjustment device, 11—material; 101—cutting pin 1 102—cogging rod, 103—cutting reel shaft, 104 1001—first connecting pin, 1002—first connecting rod, 1003—second connecting pin, 1004—second connecting rod, 1005—third connecting pin, 100—rotary bar, electric 1007—cylinder, 1008—displacement sensor; 301—helical feed head, 302—longitudinal axial pinned, 303—longitudinal axis reel shaft, 304—vertical axial flow reel governor, 305—longitudinal axial flow speed sensor; 304-1—first hydraulic cylinder, 304-2—first pulley movable portion, 304-3—first belt, 304-4—pulley fixing portion 2; 501-50-1—return plate drive mechanism; 502-1—return inertial force monitoring sensor, 502-2—first return monitoring board, 502-3—return impact force monitoring sensor, 502-4—second return measuring plate, 502-5—return installation board, 502-6—return bracket; 601—jitter plate, 602—jitter plate load monitoring device, 603—deflector, 604—chaffer, 605—vibrating screen, 602-1—jitter inertial force monitoring sensor, 602-2—first jitter monitoring plate, 602-3—jitter impact force monitoring sensor, 602-4—second jitter monitoring plate, 602-5—jitter mounting plate, 602-6—jitter bracket; 801—mounting bracket, 802—monitoring sensor; 901—image processor, 902—CCD camera, 903—grain information acquisition board, 904—light source.
Figure 15A:
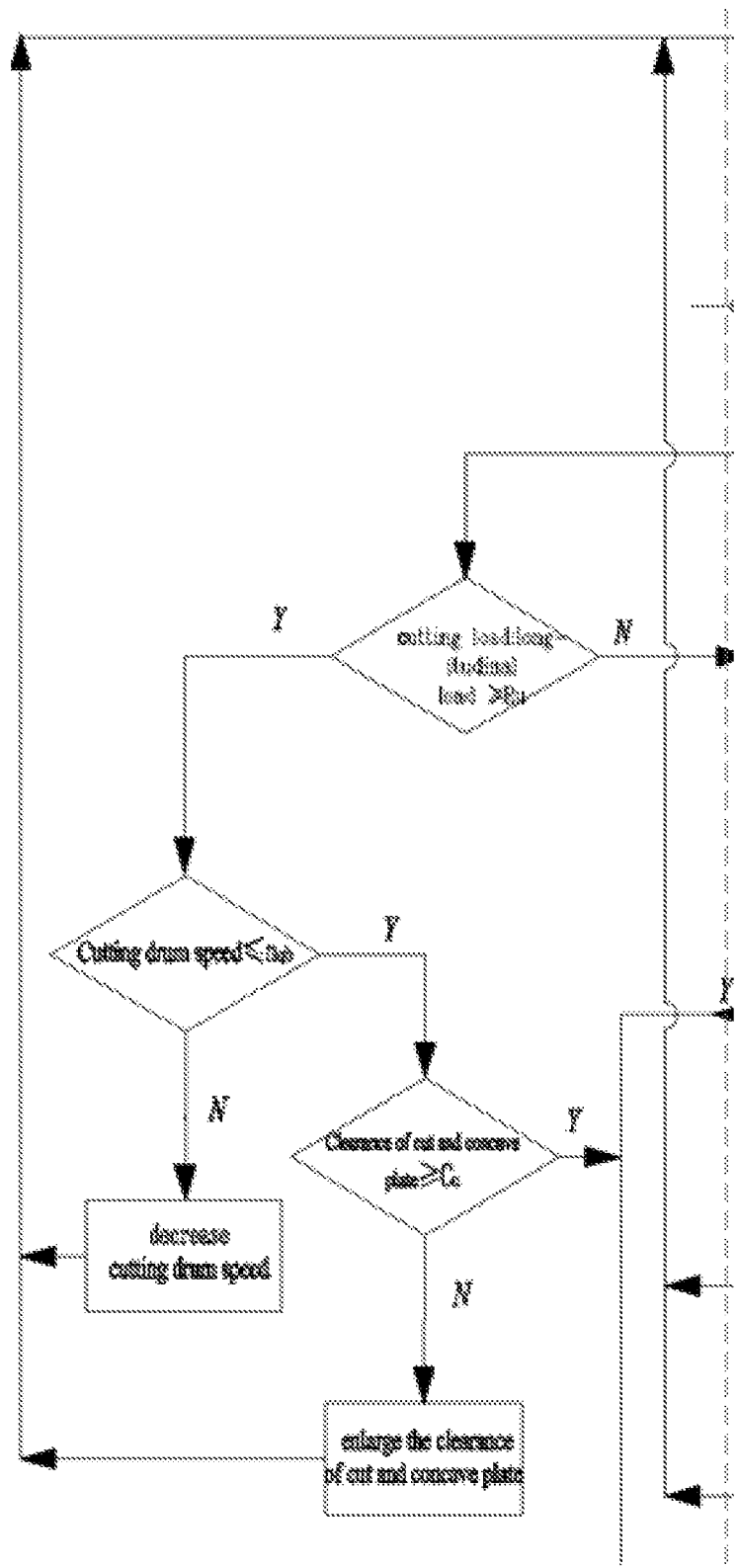
Figure 15B:
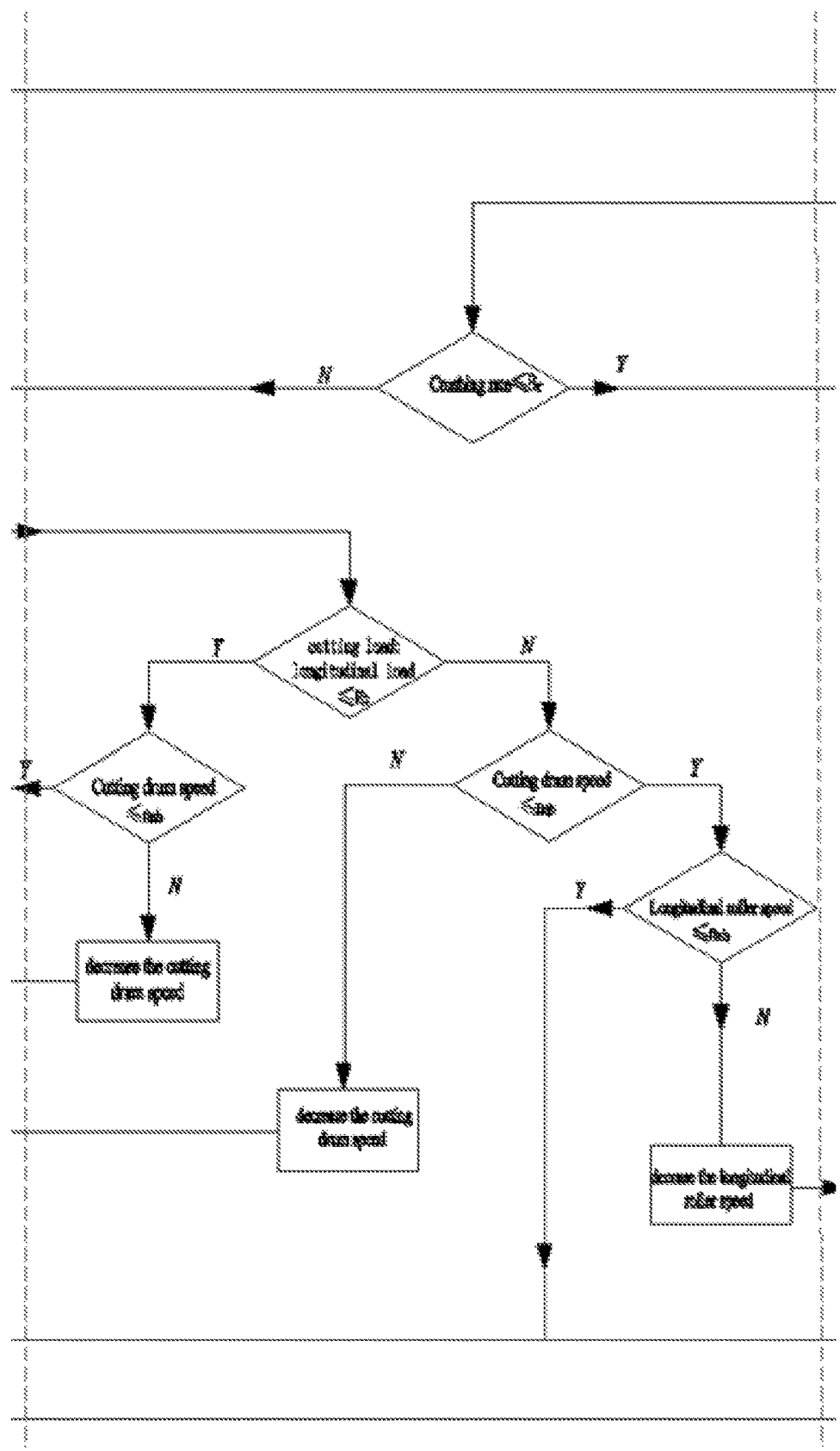
Figure 15C:
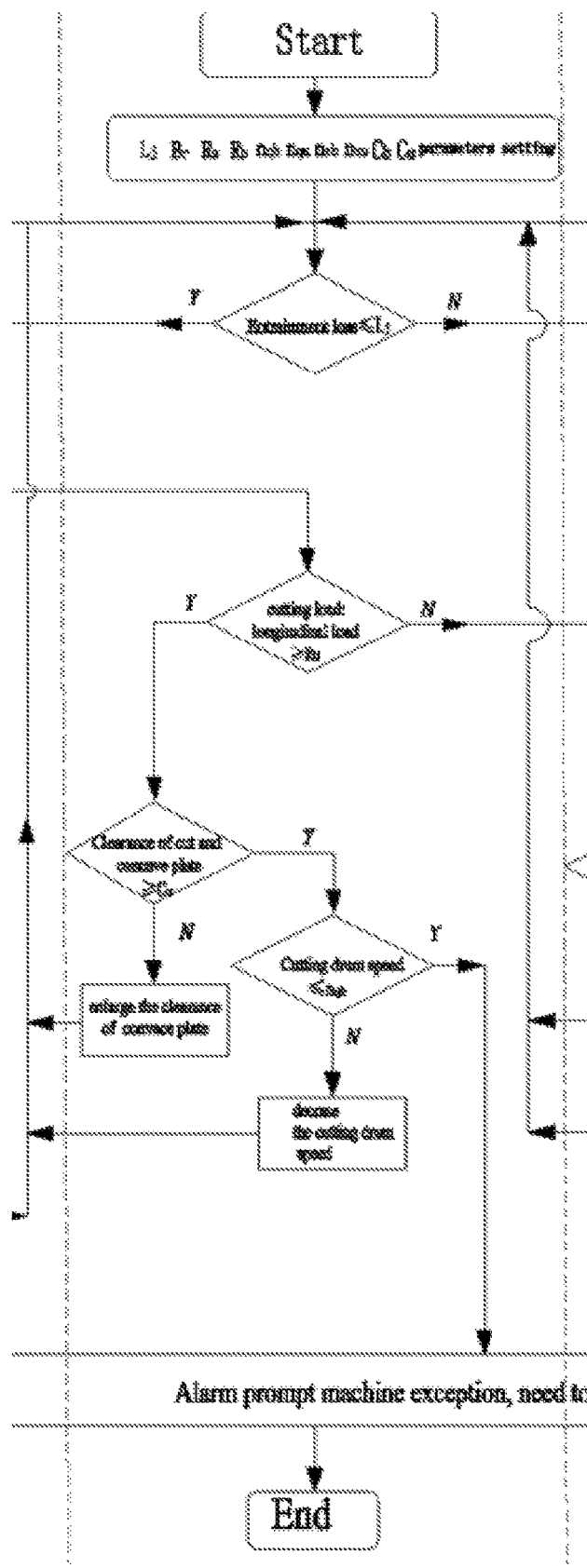
Figure 15D:
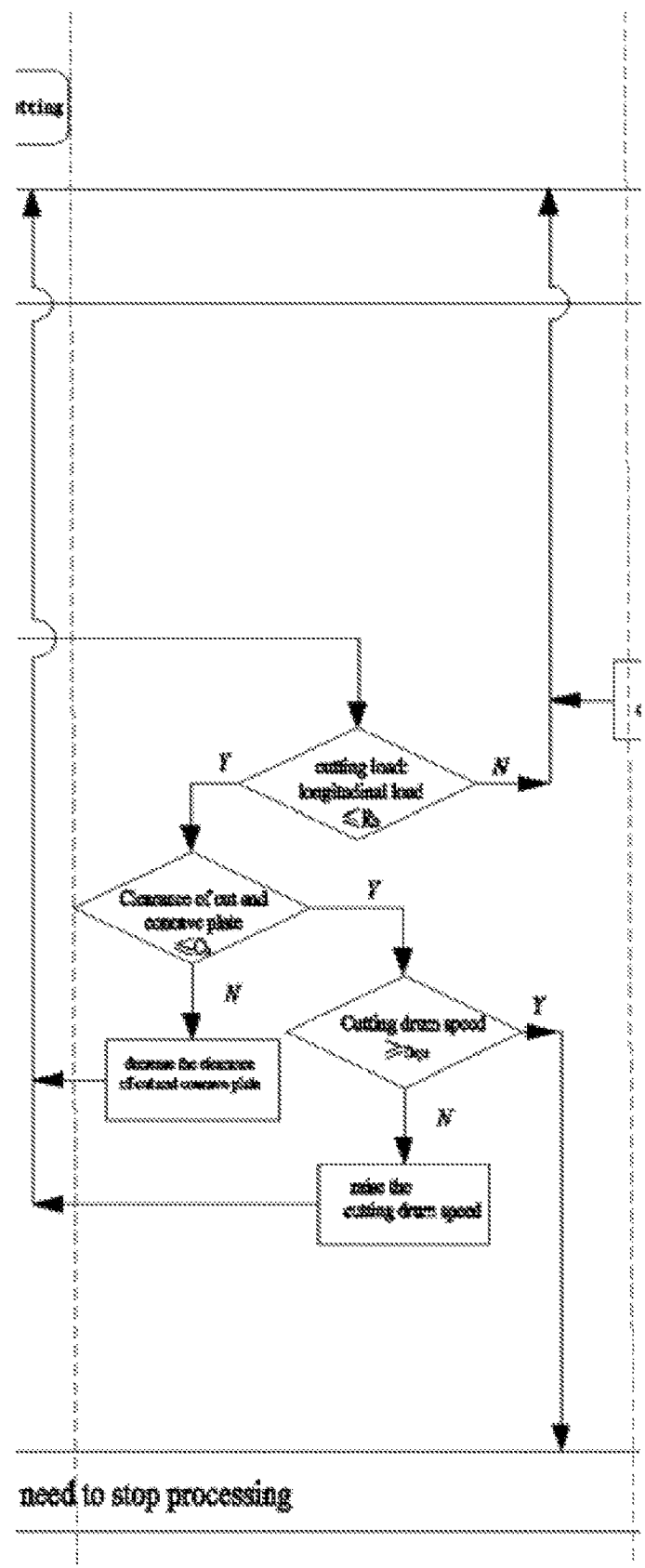
Figure 15E:
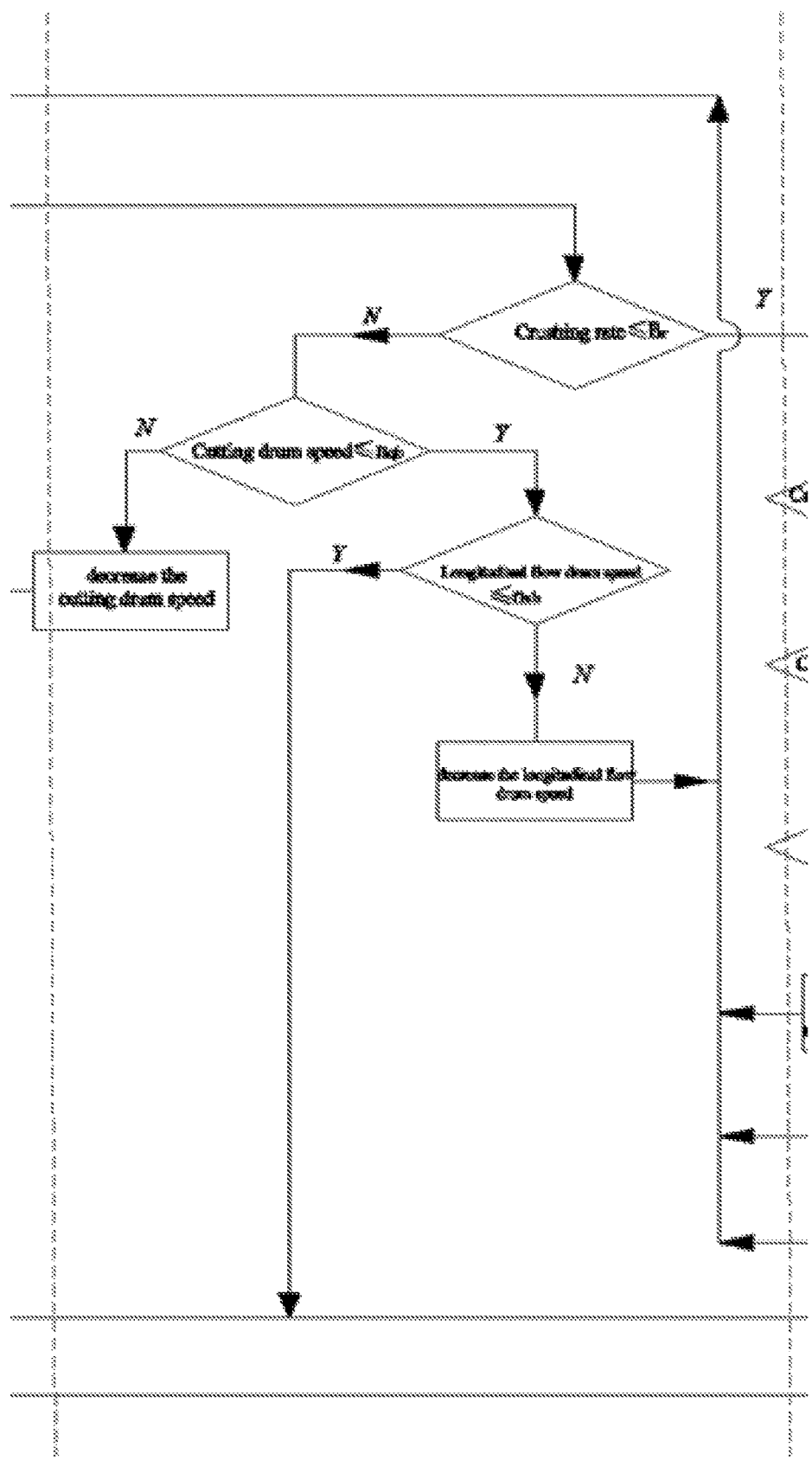
Figure 15F:
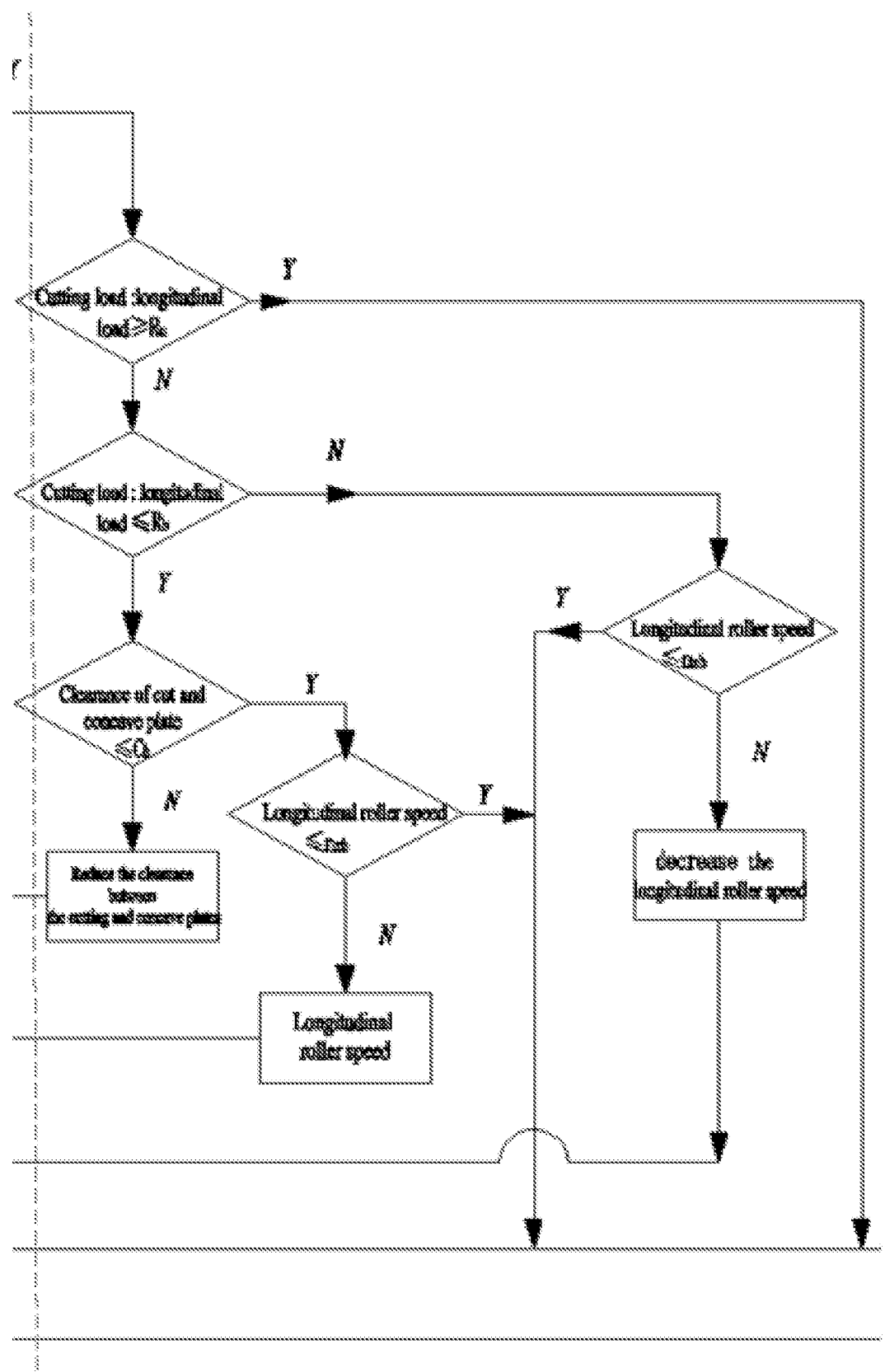

As shown in FIGS. 14 and 15-15F, an adaptive control method for the threshing and separating load of the tangential and longitudinal axial flow devices includes the following steps:

S1 according to the characteristics of crop structure, threshing and separating device and related mechanical harvesting of national standards, set a reasonable shearing flow reel 1 in the online monitoring control system 1 and axial flow reel 3 load ratio [$R_b$, $R_u$], tangential flow concave export clearance range [$C_b$, $C_u$], the shearing flow reel speed range [$n_{qb}$, $n_{qu}$], axial flow reel speed range [$n_{zb}$, $n_{zu}$], grain crushing rate threshold and entrainment loss rate threshold;

S2 through which are installed on the grain auger 7 rate at the outlet of the grain crushing monitoring device 9 for real-time detection of grain crushing rate, with concave flow on the vertical axis 4 entrainment loss monitoring device at the mouth of the grass row 8 real-time detection of entrainment loss rate;

A clearance 1005 of the cut concave plate outlet is obtained by using a displacement sensor 1008 in parallel with an electric cylinder used for adjusting the clearance of the outlet of the cut concave plate;

According to the tangential flow speed sensor 105 and axial flow speed sensor 305 respectively tangential flow speed $n_{zb}$ and axial flow speed of reel $n_z$, Through the arranged on the sieve plate 6 jitter 601 load monitoring device on board 602 real-time detection of shaking board 601 on the load, as the shearing flow reel 1 load;

The return plate load monitoring device 502 mounted on the return plate 5 detects the load on the return plate 5 in real time as a load of the longitudinal axis flow reel 3;

The on-line monitoring control system calculates the load ratio of the cutting reel 1 and the longitudinal flow reel 3 according to the load of the cutting reel 1 and the load of the longitudinal axial flow reel 3;

S3 on-line monitoring and control system based on the real-time detection of the grain crushing rate B, entrainment loss rate L, tangential flow concave outlet gap C, tangential flow of axial flow speed of reel $n_q$, reel speed $n_z$, shearing flow reel 1 and axial flow reel 3 of the load ratio R according to the following strategy to control the tangential flow concave export clearance. Tangential flow speed of reel, axial flow reel speed; return S2;

When the entrainment loss rate of grain $L \le L_j$, crushing rate $B > B_r$;

If the shearing flow reel 1 and axial flow reel 3 of the load ratio $R \ge R_u$, then determine the shearing flow reel speed $n_q$ whether or not $\leq n_{qb}$. If not, Decrease of tangential flow speed of reel $n_q$, If it is, And the tangential flow concave export clearance $C \geq C_u$, and System alarm, If it is, But the clearance between the cutting and concave plates exits $C > R_u$, and The clearance between the cutting and the concave plates is increased C;

If the cutting reel 1 is compared with the load ratio of the longitudinal flow reel 3 $R_b < R < R_u$, Then judge the speed of the cutting reel $n_q$ whether or not $\leq n_{qb}$, if not, Decrease of tangential flow speed of reel $n_q$; if so, And the axial flow reel speed $n_z \leq n_{zb}$, and System alarm, if so, But the axial flow reel speed $n_z > n_{zb}$, Decrease of axial flow reel speed; $n_z$;

If the shearing flow reel 1 and axial flow reel 3 is less than the load ratio $R \leq R_b$, axial flow speed is less than or equal to the reel to determine if it is, then, the system alarm, if not, decrease of axial flow reel speed $n_z$;

When the entrainment loss rate $L \leq L_j$, grain crushing rate $B > B_r$:

If the shearing flow reel 1 and axial flow reel 3 of the load ratio is no less than $R_u$, determine the tangential flow outlet gap C is in concave tangential flow outlet gap range $[C_b, R_u]$, if $C \geq C_u$, increases the tangential flow concave export clearance, if more than $C_u$, then determine the shearing flow reel speed $n_q$ is less than or equal $n_{qb}$. If not, then reduce the tangential flow speed of reel $n_q$, if it is, then the alarm system;

If the load ratio of the cutting reel 1 and the longitudinal flow reel 3 is $R_b < R < R_u$, the parameters are normal and need not be adjusted;

If the shearing flow reel 1 and axial flow reel 3 is less than or equal to the load ratio, determine the tangential flow outlet gap is in concave tangential flow outlet gap range $[C_b, C_u]$, if less than or equal to $C_b$, then determine the shearing flow reel speed $n_q$ is greater than or equal to $n_{qu}$, if it is, then the system alarm; if not, increases. Tangential flow speed of reel $n_q$, if $C > C_b$, decrease of tangential flow concave sieve export clearance C;

When the entrainment loss rate of grain $L > L_j$ crushing rate $B > B_r$:

If the speed is less than or equal to the shearing flow reel, determine the longitudinal axial flow reel speed $n_z$ is less than or equal to $n_{zb}$, if it is, the system alarm, if not, then reduce the axial flow reel speed $n_z$;

If the cutting reel speed is greater, then the cutting reel speed is reduced $n_{zb}$;

When the entrainment loss rate $L > L_j$, grain crushing rate less than $B_r$:

If the shearing flow reel 1 and axial flow reel 3 of the load ratio is no less than $R_u$ the system alarm;

If the shearing flow reel 1 and axial flow reel 3 of the load ratio $R_b < R < R_u$, determine the longitudinal axial flow reel speed $n_z$ is less than or equal to $n_{zb}$, if it is, the system alarm, if not, then reduce the axial flow reel speed $n_z$;

If the shearing flow reel 1 and axial flow reel 3 is less than or equal to $R_b$ the load ratio, determine the tangential flow concave gap C is less than or equal to $C_b$ export, if not, then reduce the tangential flow concave export clearance C, if further determining axial flow reel speed $n_z$ whether less than $n_{zb}$, if it is, the system alarm, if not. Decrease of axial flow reel speed $n_z$.

The foregoing embodiments are preferred embodiments of the present invention. But the present invention is not limited to the above-described embodiments. It will be apparent to those skilled in the article that any obvious modifications, substitutions, or variations are intended to be within the scope of the present invention without departing from the true spirit of the invention.

The invention claimed is:

1. An adaptive control system for load distribution between a tangential and a longitudinal threshing and separating device, comprising:
    a tangential drum;
    a longitudinal axial flow drum;
    a longitudinal flow concave plate screen mounted on the longitudinal axial flow drum;
    a return plate disposed below the longitudinal axial flow drum;
    a grain auger disposed below the return plate;
    a cleaning screen disposed above the grain auger and below the tangential drum and the return plate;
    an outlet adjustment device for regulating clearance of an outlet of the tangential flow concave plate;
    a jitter plate;
    a jitter plate load monitoring device mounted on the jitter plate;
    a return plate load monitoring device mounted on the return plate and disposed below the longitudinal axial flow drum;
    an online monitoring and control system connected to the return plate load monitoring device, the jitter plate load monitoring device, and the outlet adjustment device; and
    a displacement sensor connected to the online monitoring and control system,
    wherein jitter plate load monitoring device comprises a jitter impact force monitoring sensor and a jitter inertial force monitoring sensor,
    wherein the return plate load monitoring device comprises a return inertial force monitoring sensor, a first return monitoring board, a return impact force monitoring sensor, a second return monitoring board, a return mounting plate, and a return bracket supporting the return plate,
    wherein the return mounting plate is fixed below the return plate by the return bracket,
    wherein each of the return plate and the return mounting plate is provided with a through hole that has the same shape as the first return monitoring board and the second return monitoring board,
    wherein the through hole of the return plate corresponds to the through hole of the return mounting plate in a vertical direction,
    wherein the first return monitoring board is disposed in the through hole of the return mounting plate and maintains a gap of 0.5 mm-3 mm with an edge of the through hole,
    wherein the second return monitoring board is disposed in through hole of the return plate and maintains a gap of 0.5 mm-3 mm with an edge of the through hole,
    wherein a first end of the return inertial force monitoring sensor is fixed to the return mounting plate, and a second end of the return inertial force monitoring sensor opposite to the first end is fixed to the first return monitoring board,
    wherein a first end of the return impact force monitoring sensor is fixed to the return plate, and a second end of the return impact force monitoring sensor opposite to the first end is fixed to the second return monitoring board,
    wherein the return inertial force monitoring sensor and the return impact force monitoring sensor are connected to the online monitoring and control system, wherein the online monitoring and control system detects inertial force via the return inertial force monitoring sensor and the jitter inertial force monitoring sensor, wherein the online monitoring and control system detects impact force via the return impact force monitoring sensor and the litter impact force monitoring sensor, wherein the online monitoring and control system detects displacement via the displacement sensor, wherein the online monitoring and control system calculates a load of the tangential drum based on the jitter inertial force monitoring sensor, wherein the online monitoring and control system calculates a load of the longitudinal axial flow drum based on the return inertial force monitoring sensor and the return impact force monitoring sensor, and wherein the online monitoring and control system calculates a ratio of the load of the tangential drum to the load of the longitudinal axial flow drum and, based on the ratio and the displacement detected by the displacement sensor, causes the outlet adjustment device to adjust the clearance of the outlet of the tangential flow concave plate.

2. The adaptive control system according to claim 1, comprising:
a plurality of jitter plate load monitoring devices mounted on the jitter plate and arrange in an "X"-shaped layout; and
a plurality of return plate load monitoring devices mounted on the return plate, disposed below the longitudinal axial flow drum, and arranged in an "X"-shaped layout.

3. The adaptive control system according to claim 1, further comprising:
an entrainment loss monitoring device disposed on the longitudinal How concave plate screen; and
a longitudinal axial flow drum speed control device connected to the longitudinal axial flow drum,
wherein the entrainment loss monitoring device is connected to the online monitoring and control system, and
wherein the longitudinal axial flow drum speed control device comprises a first hydraulic cylinder, a first pulley movable part, a first belt, and a first pulley fixed part, wherein the first hydraulic cylinder and the first pulley movable part are disposed on a same side as each other, and wherein the longitudinal axial flow drum speed control device is configured to change a belt groove size of the longitudinal axial flow drum to control an axial flow speed of the longitudinal axial flow drum.

4. The adaptive control system according to claim 1, further comprising:
a grain crushing rate monitoring device mounted on the grain auger and connected to the online monitoring and control system; and
a tangential drum speed control device,
wherein the tangential drum speed control device comprises a second hydraulic cylinder, a second pulley movable part, a second belt, and a second pulley fixed part, wherein the second hydraulic cylinder and the second pulley movable part are disposed on a same side as each other, and wherein the tangential drum speed control device is configured to change a belt groove size of the tangential drum to control a speed of the tangential drum.

5. The adaptive control system according to claim 3, wherein the entrainment loss monitoring device comprises two mounting brackets attached to the longitudinal flow concave plate screen and two monitoring sensors respectively disposed on the two mounting brackets, wherein the two monitoring sensors are connected to the online monitoring and control system.

6. The adaptive control system according to claim 4, wherein the grain crushing rate monitoring device comprises an image processor, a CCD camera, a grain information acquisition board, and a light source,
wherein the image the processor is mounted on an export platform in the grain auger,
wherein the grain information acquisition board is fixed in the grain auger,
wherein the CCD camera is installed in the grain information acquisition board, and
wherein the image processor and the grain information acquisition board are connected to the online monitoring and control system.

7. An adaptive control method for load distribution between a tangential and a longitudinal threshing and separating device, the method comprising the following steps:
(S0) providing the adaptive control system according to claim 1;
(S1) according to characteristics of crop structure and desired standards, set initial values in the online monitoring control system for the ratio of the load of the tangential drum to the load of the longitudinal axial flow drum $[R_b\ R_u]$, a range of the clearance of the outlet of the tangential flow concave plate $[C_b\ C_u]$, a range of a speed of the tangential drum $[n_{qb}\ n_{qu}]$, a range of a speed of the longitudinal axial flow drum $[n_{zb},\ n_{zu}]$, a threshold of a grain crushing rate of the grain auger $[B_r]$, and a threshold of an entrainment loss rate $[L_j]$;
(S2) performing real-time detection of the grain crushing rate with a grain crushing monitoring device and of the entrainment loss rate with an entrainment loss monitoring device;
(S3) performing real-time detection of the clearance of outlet of the tangential flow concave plate using the displacement sensor;
(S4) performing real-time detection of a tangential flow speed $(n_q)$ of the tangential drum using a tangential flow speed sensor and of an axial flow speed $(n_z)$ of the longitudinal axial flow drum using an axial flow speed sensor,
(S5) performing real-time detection of a load on the jitter plate using the jitter plate load monitoring device;
(S6) performing real-time detection of a load on the return plate using the return plate load monitoring device;
(S7) calculating, by the online monitoring and control system, the ratio of the load of the tangential drum to the load of the longitudinal axial flow drum based on the load on the jitter plate and the load on the return plate;
(S8) controlling, by the online monitoring and control system, of the clearance of the outlet of the tangential flow concave plate, based on the real-time detection and calculation of the grain crushing rate (B), entrainment loss rate (L), clearance of outlet of the tangential flow concave plate (C), tangential flow speed $(n_q)$, axial flow speed $(n_z)$, and ratio of the load of the tangential drum to the load of the longitudinal axial flow drum (R), based on the following sub-steps:
(S8a) when the entrainment loss rate $L<L_j$ and the grain crushing rate $B>B_r$;
if $R>R_u$, then determine whether $n_q<n_{qb}$ and if not, decrease $n_q$, and if $n_q$ is less than or equal to $n_{qb}$ and $C>C_u$ then initiate a system alarm, and if $n_q$ is less than or equal to $n_{qb}$ but $C>R_u$, then increase C;

if $R_b<R<R_b$, then determine whether $n_q<n_{qb}$, and if not, decrease $n_q$, and if $n_q$ is less than or equal to $n_{qb}$ and $n_z<n_{zb}$ the initiate the system alarm, and if $n_q$ is less than or equal to $n_{qb}$ and $n_z<n_{zb}$ then initiate the system alarm, and if $n_q$ is less than or equal to $n_{qb}$ but $n_z>n_{zb}$, then decrease $n_z$;

if $R \leq R_b$, then determine whether $n_z$ is less than or equal to $n_{zb}$, and if it is then initiate the system alarm, and if it is not, then decrease $n_z$;

(S8b) when the entrainment loss rate $L<L_j$, and the grain crushing rate $B>B_r$:

if R is no less than $R_u$, then determine if $C>C_u$, increase C, then determine if $n_q$ is less than or equal to $n_{qb}$, and if not, then reduce $n_q$, and if it is, then initiate the system alarm;

if $R_b<R<R_u$, then no adjustments are needed;

if R is less than or equal to $R_b$, then determine whether C is in the range $[C_b, C_u]$, and if C is less than or equal to $C_b$, then if $n_q$ is greater than or equal to $n_{qu}$ initiate the system alarm and if $n_q$ is less than $n_{qu}$ increase $n_q$, and if $C>C_b$, decrease C;

(S8c) wherein the entrainment loss rate $L>L_j$ and the crushing rate $B>B_r$:

if $n_q$ is less than or equal to $n_{qb}$, determine whether $n_z$ is less than or equal to $n_{zb}$, and if it is initiate the system alarm, and if not, then decrease $n_z$;

if $n_q$ is greater than $n_{qb}$, then decrease $n_{zb}$;

(S8d) when the entrainment loss rate $L>L_j$ and the grain crushing rate B is less than $B_r$:

if R is no less than $R_u$ then initiate the system alarm;

if $R_b<R<R_u$, then if $n_z$ is less than or equal to $n_{zb}$ initiate the system alarm, and if $n_z$ is not less than or equal to $n_{zb}$ decrease $n_z$;

if R is less than or equal to $R_b$, then determine is C is less than or equal to $C_b$, and if not then decrease C, if it is then if $n_z$ is less than $n_{zb}$ initiate the system alarm, and if $n_z$ is not less than $n_{zb}$ then decrease $n_z$.

\* \* \* \* \*